US005616879A

United States Patent [19]

Yamauchi et al.

[11] Patent Number: 5,616,879

[45] Date of Patent: Apr. 1, 1997

[54] ELECTRONIC MUSICAL INSTRUMENT SYSTEM FORMED OF DYNAMIC NETWORK OF PROCESSING UNITS

[75] Inventors: Akira Yamauchi; Yasuyuki Umeyama; Kyoko Ohno, all of Hamamatsu, Japan

[73] Assignee: Yamaha Corporation, Japan

[21] Appl. No.: 398,288

[22] Filed: Mar. 3, 1995

[30] Foreign Application Priority Data

Mar. 18, 1994 [JP] Japan .................................... 6-072879

[51] Int. Cl.[6] ................................ G10H 5/00; H04Q 1/18

[52] U.S. Cl. ................................................ 84/653; 84/615

[58] Field of Search ............................ 84/600, 609, 615, 84/634, 653

[56] References Cited

U.S. PATENT DOCUMENTS

| | | | |
|---|---|---|---|
| 4,450,745 | 5/1984 | Nakada et al. | 84/659 X |
| 4,711,148 | 12/1987 | Takeda et al. | 84/615 X |
| 4,736,663 | 4/1988 | Wawrzynek et al. . | |
| 4,788,896 | 12/1988 | Uchiyama et al. | 84/624 |
| 4,984,497 | 1/1991 | Inagaki et al. | 84/602 X |
| 5,418,320 | 5/1995 | Higashi | 84/609 X |

FOREIGN PATENT DOCUMENTS 62-129889 6/1987 Japan .

*Primary Examiner*—William M. Shoop, Jr.
*Assistant Examiner*—Jeffrey W. Donels
*Attorney, Agent, or Firm*—Graham & James LLP

[57] ABSTRACT

A dynamic musical system performs a desired musical operation. A plurality of processing units are linked altogether to constitute a network which can distribute therethrough information associated to the musical operation. Each processing unit operates to process the distributed information by a given throughput and can be connected to an external device associated to the musical operation so as to control the same. A master processing unit is selected in the network for checking a characteristic profile of each slave processing unit at least in terms of the throughput thereof and the external device if connected thereto. The master processing unit further allocates adequate jobs to the respective slave processing units according to their characteristic profiles so that all the processing units cooperatively carry out the allocated jobs by either of processing the distributed information and controlling the external device to thereby perform the desired musical operation altogether.

7 Claims, 24 Drawing Sheets

| Logical address | Unit code | Function |
|---|---|---|
| 0 | MAIN | Main unit |
| 1 | KB* | Keyboard |
| 2 | PN* | Panel switch |
| 3 | TG* | Tone generation unit |
| 4 | MIDI* | MIDI interface |
| 5 | ASSN | Assigner unit |
| 6 | AUDIO* | Audio unit |
| 7 | PSM | Program server |
| 8 | NONE* | Absent |

FIG.6

| Physical address of transmitting unit | Physical address of transmitting unit | Logical address of transmitting unit | Logical address of transmitting unit | Control information | Data | End code |
|---|---|---|---|---|---|---|

FIG.7

| Number | Asigment condition | Physical address |
|---|---|---|
| 1 | KB | ********** |
| 2 | Automatic performance | ********** |
| 3 | MIDI 1 — 8ch | ********** |
| 4 | MIDI 9 — 16ch | ********** |

FIG.8

| Channel No. | TG unit No. | Operating state of channel |
|---|---|---|
| 1 | 1 (Physical address) | |
| 2 | | |
| 3 | | |
| 4 | | |
| 1 | 2 (Physical address) | |
| 2 | | |
| 3 | | |
| 4 | | |

ELECTRONIC MUSICAL INSTRUMENT SYSTEM FORMED OF DYNAMIC NETWORK OF PROCESSING UNITS

BACKGROUND OF THE INVENTION

The present invention relates to an electronic musical instrument formed of a network of processing units and designed to realize flexible and diverse extension of musical performance.

A conventional network system is composed of a plurality of electronic musical instruments which are interconnected to one another through Musical Instrument Digital Interface (MIDI). The MIDI is designed as a common standard for transmission of automatic performance data or the like. The MIDI enables one-way transmission of a performance data such as a key code from one to another of the electronic musical instruments which are distributed on the network. The conventional system using the MIDI may be added with other devices than the electronic instruments, such as a computer, a printer and a disk driver. However, in order to connect these devices to the network, each device disadvantageously requires a separate control program and a processor for running the program.

Another type of an electronic musical instrument system is disclosed, for example, in Japanese Patent Application Laid-open No. 62-129889 (1987). As shown in FIG. 33, this system is composed of a controller 201 which functions as one electronic musical instrument, another electronic musical instrument 202, a floppy disk device 203 and a printer 204, those of which are interconnected altogether by a network 205. The controller 201 includes various components such as processor (CPU) 206, read-only memory (ROM) 207 for a basic system, random access memory (RAM) 208 for a basic system, RAMs 209-1,209-2 and 209-3 for extended devices, tone generating circuit (TG) 210, output amplifier 211, loudspeaker 212, panel interface (I/F) 213, console panel 214, bas interface (I/F) 215, control interface (I/F) 216, command panel 217, start information input unit (SIIU) 218, and internal bas 219 which interconnects the various components.

In operation of the FIG. 33 system, the console panel 214 or else is manipulated to play a performance so that a corresponding performance data is inputted into the basic RAM 208 and the tone generating circuit 210 through the panel interface 213 within the controller 201. Then, the tone generating circuit 210 generates a certain tone signal, which is amplified by the output amplifier 211 and sounded from the loudspeaker 212. In this operation, the processor (CPU) 206 optionally applies various processings such as waveform shaping to the performance data inputted from the console panel 214. Thereafter, the processed performance data is fed to the tone generating circuit 210. The processor 206 carries out the various processings based on an operating system program stored in the basic ROM 207. The basic RAM 208 is used for primary storage of the performance data and for various working areas.

Referring to FIG. 34, brief description is given for transmitting/receiving procedure of information in the network system of FIG. 33. In this example, the controller 201 functions as a master unit and the remaining devices connected to the network 205 are slave units. The master and slave units are powered, and then each slave unit checks as to if a signal transmission is allowable in the network. The signal transmission may be allowed when other signals are not circulated in the network. Then, the slave unit transmits a registration request signal to the network. The master unit waits for a registration request signal from the slave unit. Upon receipt of the registration request signal, the master unit addresses the requesting slave unit so as to receive therefrom an identification code (ID) and a control program. In response, the addressed slave unit transmits its own ID and the requested control program. Then, the master unit loads the transmitted ID and the control program into one of device-extension RAMs 209-1, 209-2 and 209-3. At this moment, the master unit checks as to if a communication error occurs. If YES, the master unit indicates an error message and stops the registration procedure of the slave unit. By such a manner, the master unit collects the respective control programs of all the slave units. The master unit executes the collected control programs to transmit various commands to the slave units to thereby control the same. Consequently, under the control by the controller 201, the slave floppy disk device 203 can record the performance data, and the slave printer 204 can print out the performance data.

SUMMARY OF THE INVENTION

Such a system can achieve various functional extension by means of the network. However, all of the processings are concentrated into the master controller, which may suffer from a heavy work load. Consequently, an entire performance of the system is disadvantageously restricted by a throughput of the controller. Further, the conventional system cannot efficiently utilize all of resources involved in the system. For example, the network system may include another electronic musical instrument which has an information processing ability sufficient to function as a controller. However, the conventional system cannot utilize such a resource. In view of this, an object of the present invention is to provide an electronic music instrument system which can realize desired expansion of a network and which can efficiently utilize resources involved in the network.

According to the invention, a dynamic musical system for performing a desired musical operation, comprises a plurality of processing units linked altogether to constitute a network which can distribute therethrough information associated to the musical operation, each processing unit being operative to process the distributed information by a given throughput and being connectable to an external device associated to the musical operation so as to control the same, check means installed in the network for checking a characteristic profile of each processing unit at least in terms of the throughput thereof and the external device if connected thereto, and allocation means installed in the network for allocating adequate jobs to the respective processing units according to their characteristic profiles so that the processing units cooperatively carry out the allocated jobs by either of processing the distributed information and controlling the external device to thereby perform the desired musical operation altogether.

In a specific form, the inventive dynamic musical system further comprises storage means installed in the network for storing various programs, and providing means for selectively retrieving a particular program from the storage means and providing the same to a selected processing unit according to the job allocated thereto so that the selected processing unit operates according to the provided program to carry out the allocated job.

In another specific form, the inventive dynamic musical system includes a first processing unit allocated with an input job to successively admit event information from an external device, a set of one or more second processing unit assigned with a tone generation job such that the set has a plurality of channels which selectively process the event information to generate a corresponding musical tone, the channels being divided into a plurality of groups, a plurality of third processing units allocated with an assignment job and corresponding to the plurality of the groups such that the each third processing unit assigns the event information to one channel of the corresponding group, and a fourth processing unit assigned with a meta-assignmnent job to successively receive the event information from the first processing unit and to selectively distribute the received event information to one of the third processing units.

In the inventive musical system, various jobs are adequately and automatically distributed and allocated to the respective processing units involved in the network to thereby realize flexible expansion of the network in terms of processing unit numbers, system size and others, in contrast to the conventional system where one processing unit handles all jobs. Further, the inventive electronic musical instrument system can efficiently utilize the resources of the network by the adequate allocation of the diverse jobs to the respective processing units.

BRIEF DESCRIPTION OF DRAWINGS

FIG. 6 is a schematic diagram showing an example of a data packet.

FIG. 7 is a table diagram showing an example of assignment conditions by a meta-assigner unit.

FIG. 8 is an assignment table diagram used by an assigner unit.

DETAILED DESCRIPTION OF THE INVENTION

Figure 1:
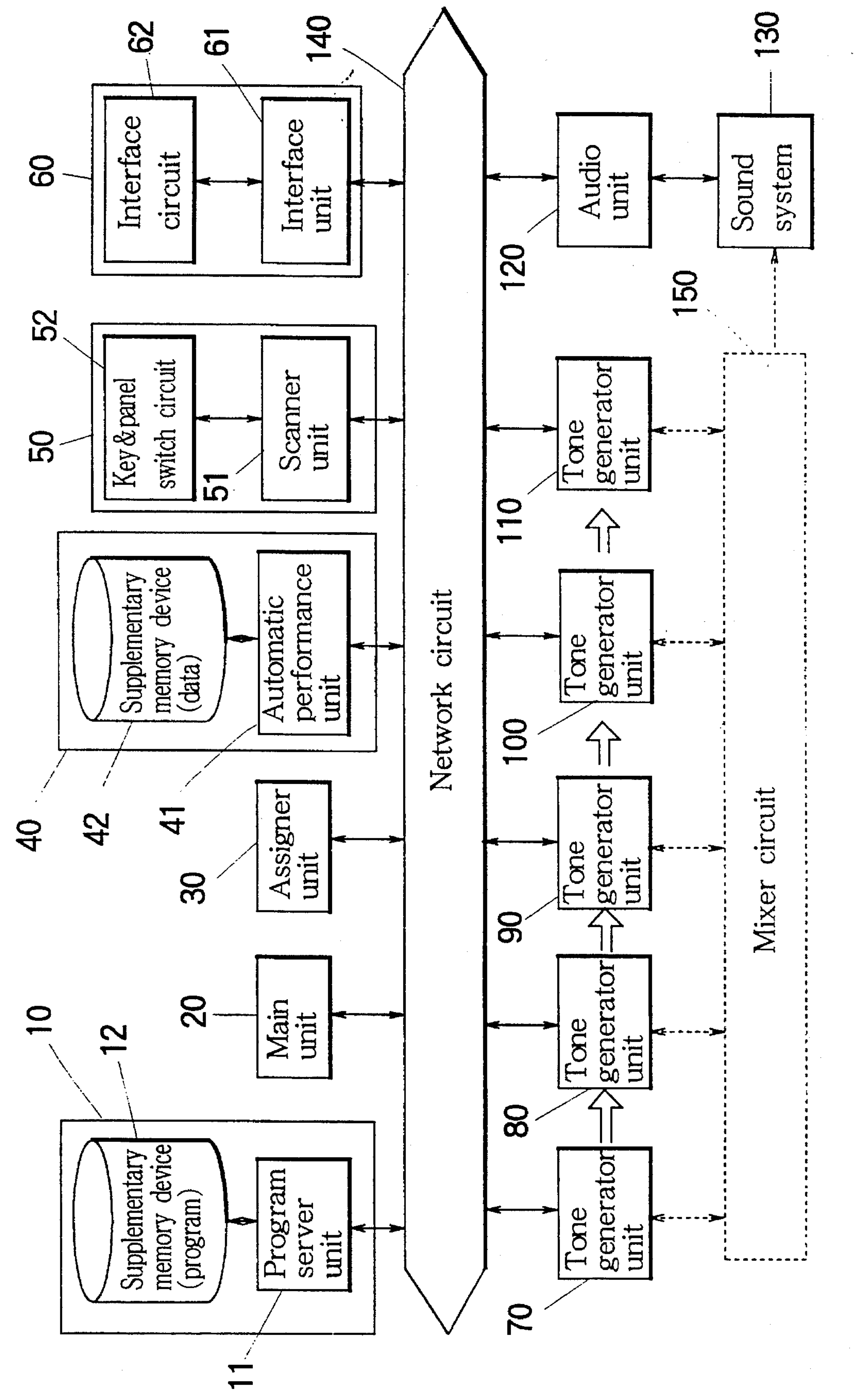
FIG. 1 is an overall block diagram showing an electronic musical instrument network system according to the invention.

Referring to FIG. 1, the inventive electronic musical instrument system is composed of a program server module 10, a main unit 20, an assigner unit 30, an automatic performance module 40, a scanner module 50, an external communication module 60, tone generator units 70, 80, 90, 100 and 110, and an audio unit 120, all of which are connected to a network circuit. 140. The system includes the various modules and units. Each unit performs information processing by itself, and therefore may be occasionally called "module" in this specification. The respective modules are allocated with various jobs or information processings, which are not provisionally determined except for the main unit 20, but are adequately distributed by the main unit 20 at the time of booting the system.

These modules are composed of a universal processing unit, and are linked together to build up a dynamic network, thereby facilitating modification and extension of the system for improving a musical performance of the system. The individual module contains a central processing unit (CPU) of the universal type. A particular control program is loaded into a CPU of each module prior to the start of processing of musical performance information associated to musical operation of the system so that the module can carry out the allocated job. These modules may be placed in physically remote spots, or otherwise these may be concentrated in one spot. In either case, the modules are interconnected together through the network to form a musical system having a large or small scale.

After the module receives the allocated control program, the module operates based on the control program to issue a command to the network. The command is labeled by an address of a destined module. The addressed module receives the command to execute a requested information processing. For example, during the course of a general keyboard process, a scanner unit 51 contained in the scanning module 50 detects key-on event information, which is then transferred to the assigner unit 30. The assigner unit 30 manages the tone generator units 70–110, and selects a vacant channel from these tone generator units. The assigner unit 30 transfers the received key-on event information to the vacant channel. The vacant channel produces a digital data of a musical tone corresponding to the transferred key-on event information. The digital data is transferred to the audio unit 120 through the network circuit 140. The audio unit 120 correctly rearranges the received digital data along a time axis, because the initial data is modulated in various manners to facilitate efficient transfer thereof in the network. The rearranged digital data is fed to a sound system 130, which finally produces an analog musical tone.

In such a system, an additional tone generator unit may be connected to the network to increase a number of tone generating channels. The added tone generator unit is automatically recognized by the main unit 20. Accordingly, an old channel assignment program of the assigner unit 30 is modified to manage the new tone generator unit. Further, in case that the unit 30 which serves as the assigner is eventually disconnected from the network, a relatively free unit having a sufficient scope such as the scanner unit 51 may be newly allocated with an assignment job so that the scanner unit 51 carries out a multitask of the keyboard scanning and the channel assignment. By such a manner, in the inventive electronic musical instrument system, adequate programs are allocated to the universal processing units to thereby freely achieve extension or contraction of the system. Jobs are adequately distributed so as to optimumly execute the total information processing in various combinations of modules.

Next, detailed description is given for the individual modules. Referring again to FIG. 1, the program server module 10 is composed of a program server unit. 11 and a supplementary memory device 12 which stores various application and control programs. The server module 10 operates according to a program request from the main unit 20 to transfer a requested program from the supplementary memory device (program storage) 12 to the main unit 20. The main unit 20 controls the entire system by checking characteristic profiles of all modules connected to the network when the system is booted so as to provide adequate programs which are retrieved from the server module 10 to the respective modules. In this embodiment, the memberships and the characteristic profiles of the modules are checked only when the system is entirely booted so as to distribute the programs. In modification, such a check can be conducted during the course of operating the system so as to enable optimum distribution of resources at all times.

The assigner unit 30 assigns a tone generation command such as key event information accepted by the system to one of the tone generator units 70–110. Further, the assigner unit 30 specifics a particular channel of the tone generator unit. For this, the assigner unit 30 stores a table data indicating an operating status of each tone generating channels. Slow processing of the channel assignment may cause a delay of actual generation of a musical tone. In order to increase the processing speed, the channel assignment job may be distributed to a multiple of assigner units, while a meta-assigner unit is provided to manage or supervise the assigner units. This meta-assigner unit examines a nature of a received tone generation command to select a particular assigner unit which should treat that command. Then, the selected assigner unit processes the command fed from the meta-assigner unit to assign the same to a vacant channel of one tone generator unit. For example, the musical system includes a keyboard module and an automatic performance module. These modules successively produce a sequence of tone generation commands which are once transferred to the meta-assigner unit. The meta-assigner unit separately distributes one tone generation command from the keyboard module and another tone generation command from the automatic performance module to different assigner units.

Generally, the assignment process includes searching for vacant channels and checking for an operating state of each channel by truncation method or else. For this, the assigner unit must periodically scan all of the channels. The more the number of the tone generating channels, the longer the time required for the channel scanning. In view of this, the meta-assigner unit is provided to divide the assignment job to a plurality of assigner units to thereby shorten the time required for the tone generation. The meta-assigner unit sorts the tone generation commands according to kinds of devices which originate the commands in this embodiment. Alternatively, the meta-assigner unit may sort the tone generation commands according to odd and even key codes, according to higher and lower note ranges, according to MIDI channel numbers, or according to tone colors. Further, in case that the meta-assigner unit has a relatively small overhead time of data communication, different sorting methods are combined to carry out the meta-assignment by multi-steps, thereby further shortening the channel assignment process. In another modification, the meta-assigner unit can assign the tone generation command to one of the assigner units, which keeps a vacant channel in analogous manner to the regular tone generation assignment. In such a case, it might take a considerable time that the meta-assigner unit directly detect the assigner units which keep a vacant channel. In view of this, each assigner unit notifies existence and/or number of vacant channels under the management. The meta-assigner unit passes the tone generation command to the assigner unit keeping a vacant channel or keeping a maximum number of vacant channels to thereby achieve efficient tone generation assignment process.

The automatic performance module 40 is composed of an automatic performance unit 41 and a supplementary memory device 42. The automatic performance unit 41 operates in response to a request from the main unit 20 to retrieve from the supplementary memory device 42 a recorded performance data, which is then fed to the assigner unit 30 as the tone generation command.

The scanner module 50 is composed of the scanner unit 51 and a key and panel switch circuit 52. The scanner unit 51 scans the key and panel switch circuit 52 to detect a key event and a panel switch event in response to a live performance. The detected key event is fed to the assigner unit 30 as the tone generation command together with the detected panel switch event. The inventive musical system includes a single assigner unit or a single meta-assigner unit which manages a plurality of assigner units, hence the scanner unit 51 can simply transmit the tone generation command to that single unit without regard to operating states of the assigner units and the subsequent tone generator units.

The external communication module 60 is composed of an interface unit 61 and an interface circuit 62, which may be formed of MIDI commonly used in a typical electronic musical instrument. The external communication module 60 receives a tone generation event involved in a MIDI signal which is externally inputted into the musical system by telecommunication or else, and transmits the tone generation event to the assigner unit 30 as the tone generation command. Further, the communication module 60 transmits control information contained in the MIDI signal to the main unit 20 for controlling the musical system.

The tone generator units 70–110 are a module having communication function to the network for tone generation. The respective tone generator units 70–110 may have different tone generation mechanisms and different numbers of concurrent channels. One tone generator unit may be a waveform memory type which generates a musical tone data using an internal memory storing waveforms. Other tone generating units may be an FM type or a simulation type using DSP, which generates a musical tone data according to a microprogram. These tone generator units may be provisionally stored with the waveform data and the microprogram. Alternatively, these waveform data and microprogram may be provided from the program server module 10 at the time of booting the musical instrument system. The main unit 20 loads an assignment program to the assigner unit 30 according to the tone generation mechanism and the channel number of the involved tone generator units when the musical system is booted.

The tone generator units 70–110 receive the tone generation command (musical event information) from the assigner unit, 30, and activate a designated channel to start synthesis of a musical tone. The synthesized digital data of the musical tone is fed to the audio unit 120 through the network circuit 140. While the tone generator units 70–110 are distributed over the network circuit 140 even remotely from each other, all of the outputs from the tone generator units 70–110 are collected to the audio unit 120 to thereby readily produce a final analog musical tone. Practically, the network circuit 140 may have a rather slow data transfer rate. In some occasion, the network system may be confined within a small area as in the FIG. 1 embodiment where the entire system is built in a complete musical instrument. In these cases, outputs from all of the tone generator units 70–110 may be directly collected to a mixer circuit 150 (indicated by the dashed line) to mix the collected outputs, rather than using the network circuit 140. In this embodiment, the audio unit 120 processes and integrates the digital data fed from the tone generator units 70–110 to provide digital audio information to the sound system 130.

The network circuit 140 links the modules and units together in a bas link form, a ring link form or other forms. The individual module is identified by a physical address and a logical address in the network. The physical address is unique to the individual module, and is never changed. On the other hand, the logical address is set when the musical instrument system is booted such that one address is defined for one job. For example, one module may conduct two jobs of channel assignment and automatic performance. In such a case, that module has one physical address and two logical addresses. The logical address has a hierarchical data structure such that a higher order data indicates a job allocated to the module and a lower order data indicates a code of plural modules which are allocated with the same job. By such a logical address data structure, needed information can be broadcasted to all the modules which execute the same job without individually specifying these modules. For example, when an error occurs in the musical system, all of the generated tones must be stopped instantly. In such a case, the system broadcasts a message demanding instant stopping of the tone generation together with a logical address which exclusively designates the tone generator units so as to silence all of the tone generator units concurrently, rather than transmitting an individual message to the respective tone generator units.

Figure 2:
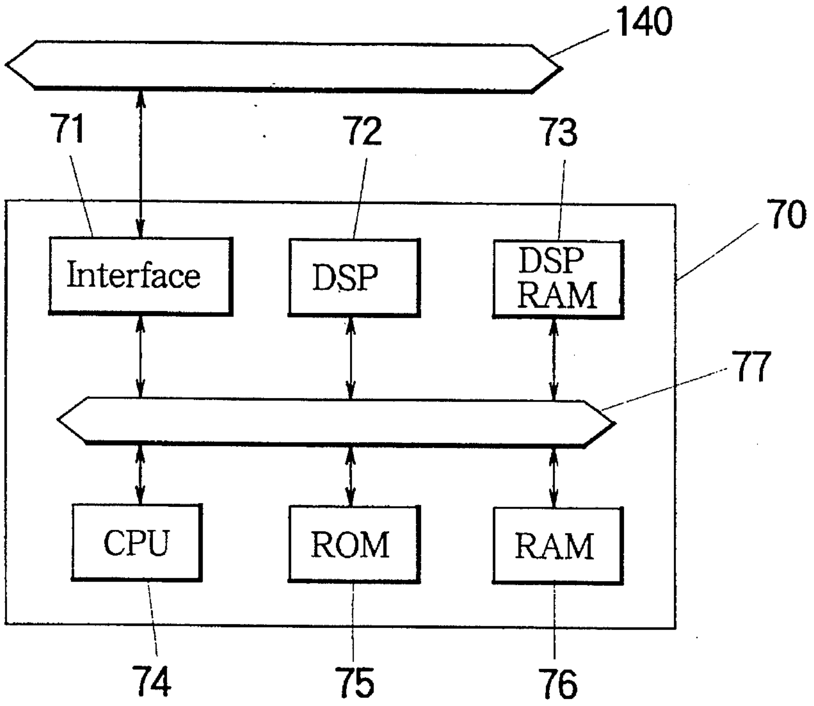
FIG. 2 is a block diagram showing a tone generating unit utilizing a digital signal processor (DSP).

Referring to FIG. 2, the first tone generating unit 70 is constructed by using DSP. The tone generating unit 70 has an interface 71 which is connected to the network circuit 140 to selectively admit from the network a data packet which is labeled by the physical address unique to the unit 70 or labeled by the broadcast address (higher order data of the logical address). Further, the tone generating unit 70 forms a data packet based on various data under the control by CPU 74, and transmits the formed packet to the network circuit 140. The DSP 72 synthesizes a musical tone signal according to a microprogram stored in a RAM 73. The microprogram is loaded from the program server module 10 when the system is booted. Further, a substitute microprogram may be loaded during the course of operating the system in order to change a timbre of the synthesized musical tones. The CPU 74 operates according to a control program which is loaded into another RAM 76 from the program server module 10 for carrying out the management of the interface 71 and the control of the DSP 72, as well as for executing an initial booting program stored in a ROM 75. The musical tone synthesis by DSP can realize various modes of tone generations according to kinds of the installed microprograms, such as a simulation tone generation which simulates an acoustic musical instrument, a waveform memory tone generation which utilizes the RAM 76 for a waveform memory, and an FM tone generation.

Figure 3:
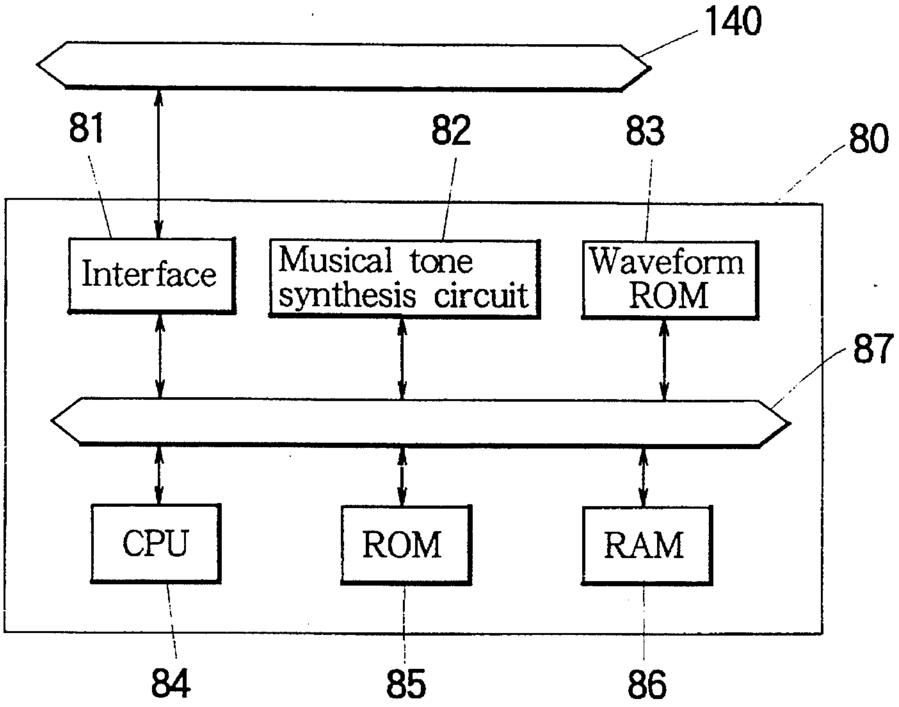
FIG. 3 is a block diagram showing another tone generating unit utilizing a waveform memory.

Referring to FIG. 3, the second tone generating unit 80 is a waveform memory type, which is different from the first tone generating unit 70 of FIG. 2 in that a musical tone synthesis circuit 82 is provided in place of the DSP, and a waveform ROM 83 is provided in place of the RAM 73. As mentioned before with reference to FIG. 2, the DSP 72 can be used to construct the tone generator of the waveform memory type. However, the FIG. 3 construction having a specialized board using a hardware is advantageous over the FIG. 2 structure. Further, the musical tone synthesis circuit 82 may be composed of a waveform memory musical tone synthesizing LSI.

Figures 4, 5:
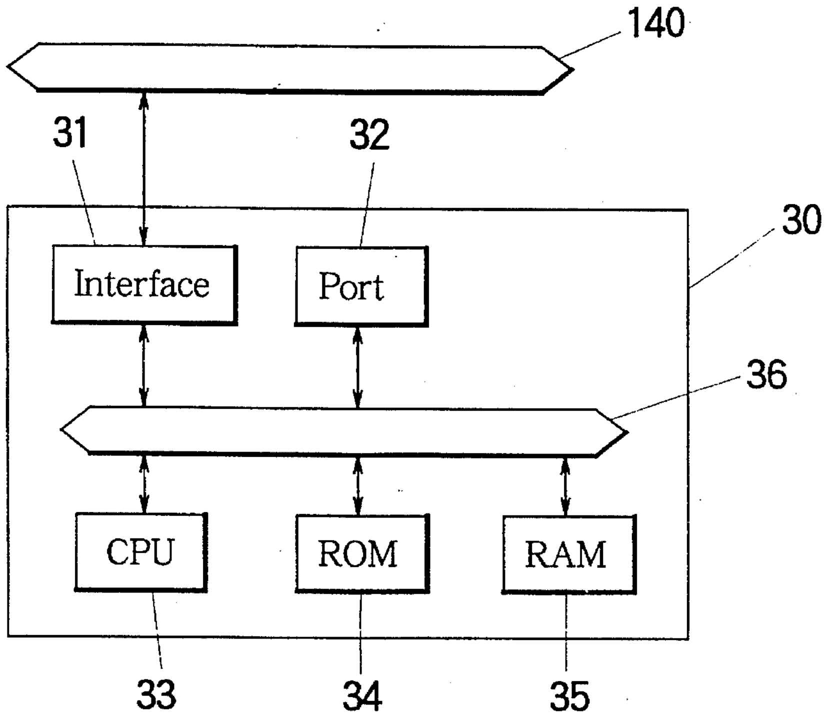
FIG. 4 is a block diagram showing a universal processing unit.
FIG. 5 is a reference table diagram of logical addresses.

Referring to FIG. 4, the universal processing unit 30 has an interface 31 connected to the network circuit 140. A port 32 is provided for connection to an external device. For example, the key and panel switch circuit 52 is connected to the scanning unit 51 by the external device connection port. A ROM 34 is provided for storing an initial booting program. A RAM 35 is provided to store a particular control program retrieved from the program server module so that the universal unit 30 is functionally specialized to the assigner unit or else under the control by the program. Further, the RAM 35 is utilized for a working area of a CPU 33 which executes the control program. Such a structure of the universal unit is common to the various modules. However, the main or master unit stores a specific booting program in the ROM, which is different than a general booting program stored in the remaining slave units.

Figure 9:
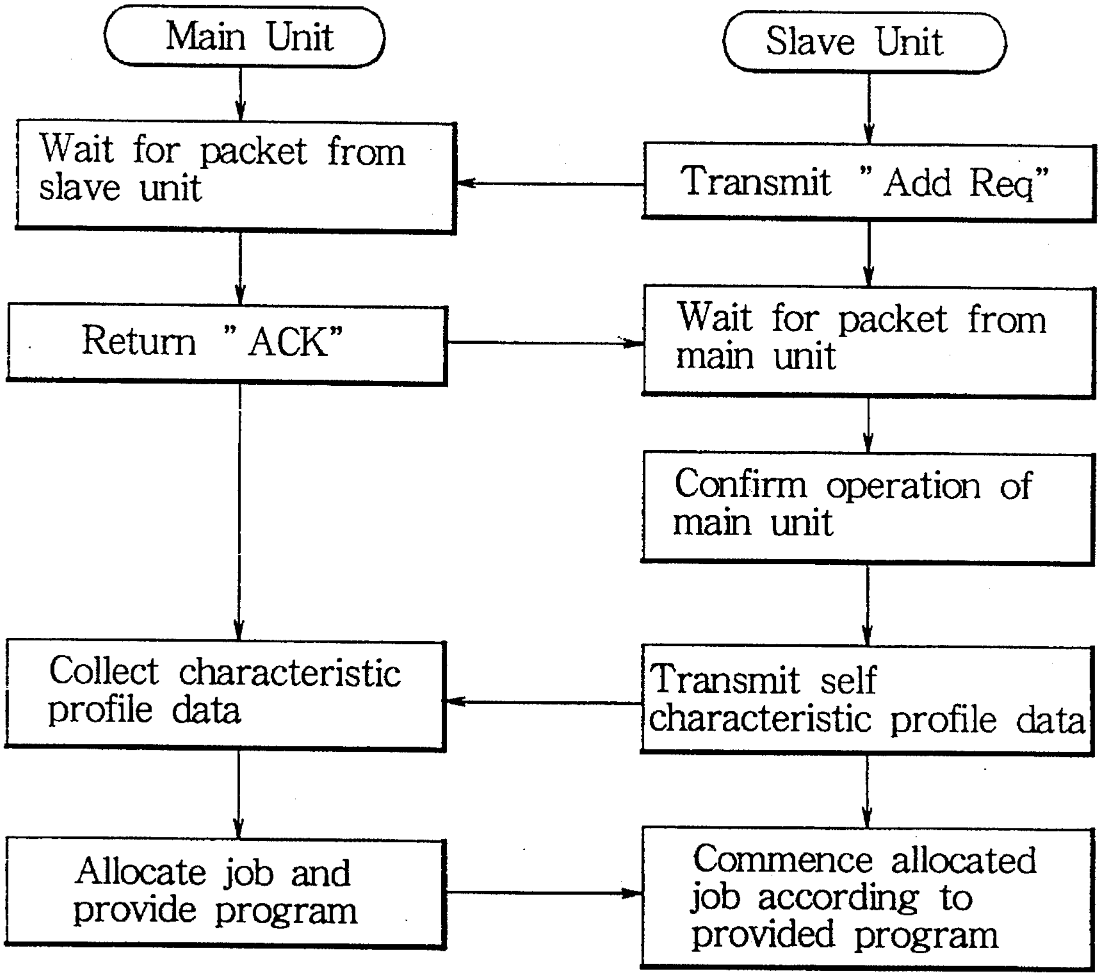
FIG. 9 is an operational diagram showing an overall operation of the inventive network system.

Referring to FIG. 9 which schematically shows basic operation of the inventive musical system, a master unit (i.e., the main unit) and slave units (i.e., universal units) communicate with each other when the system is booted. In this initial communication, the slave unit transmits an address request command "Add Req" to the network as a broadcast message, and waits for a reply packet from the master unit. The master or main unit has the specific initial booting program effective to exclusively respond to the command Add Req. Thus, the main unit returns an acknowledgement command "ACK" together with the physical address of the requesting slave unit in response to the command Add Req. The slave refit transmits the command Add Req in a packet form as exemplified in FIG. 6. It should be noted that this packet form uses a broadcast code in place of the physical address of a receiver unit at the time of booting the system because physical and logical addresses are not yet known. During the system booting period, the main unit waits for this packet from the slave unit. Upon receipt of the packet, the main unit recognizes a physical address of the transmitting slave unit from the received packet.

Upon receipt of the return command ACK from the main unit, the slave unit can confirm that the main unit is working, and can recognize the physical address of the main unit from the received data packet. Then, the slave unit transmits its own characteristic profile in terms of its rated throughput or information processing speed and its associated external device such as a keyboard, if connected, to the main unit in the packet form.

By such a manner, the main unit collects the respective characteristic profiles from all of the slave units by exchanging the data packets. The main unit checks the collected characteristic profiles of the slave units and allocates adequate jobs to the respective slave units. For example, the keyboard scanning job is suitably allocated to one slave unit connected to the keyboard. Moreover, the main unit transmits an application or control program to the slave unit to enable the same to perform the allocated job, together with a logical address which corresponds to the allocated job. On the other hand, the slave unit performs the allocated job according to the program automatically loaded by the main unit. By such a manner, each slave unit initially having no control program and no logical address can be booted by the master unit through the network. Accordingly, the inventive musical instrument system can freely extend its musical performance or operation by simply adding a universal processing unit to the network and by allocating an adequate job to the added unit. Further, diverse jobs can be optimumly distributed to the slave units according to their characteristic profiles to thereby efficiently utilize the resources without imposing a heavy work on a player or operator.

Figure 10:
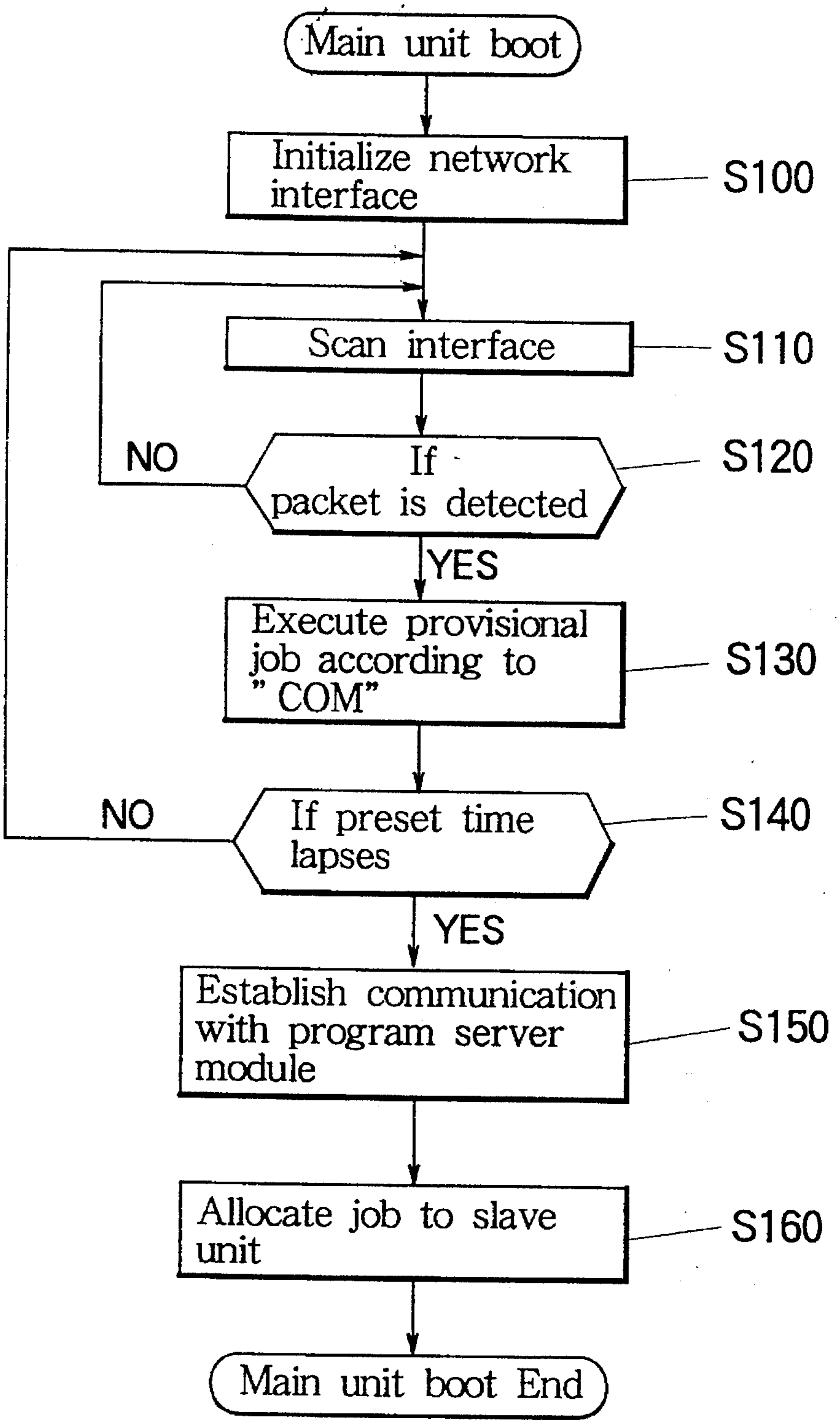
FIG. 10 is a flowchart showing a boot process of a main processing unit.

Next, detailed description will be given for operation of the main and slave units in conjunction with flowcharts of FIGS. 10–32. Referring first to FIG. 10, the main unit 20 executes a main unit boot process according to a basic job program installed in the internal ROM. In this process, first Step S100 is undertaken to initialize a network interface. Then, Step S110 is undertaken to scan the interface to detect a packet from the slave units. Steps S110 and S120 are repeatedly executed until the detection of the packet. When the detection of the packet is confirmed by Step S120, subsequent Step S130 is undertaken to execute a provisional job according to a command "COM" contained in the detected data packet. The routine of Steps S110–S140 is repeatedly executed until a preset time lapses. Namely, the main unit 20 is set to accept commands associated to the system initialization within the preset time. Normally, the respective units connected to the network can be booted substantially at the same time so that the main unit 20 operates to recognize only the active units which successfully opens communication with the main unit within the limited preset time, as the actual resources of the musical system. After passing the initial preset time, Step S150 is undertaken to establish the communication with the program server module which stores various application and control programs. Then, Step S160 is undertaken to carry out the function or job allocation process where adequate control programs are loaded into the respective universal units according to their characteristic profiles to specialize the same. Thus, the boot process of the main unit is ended.

Figure 11:
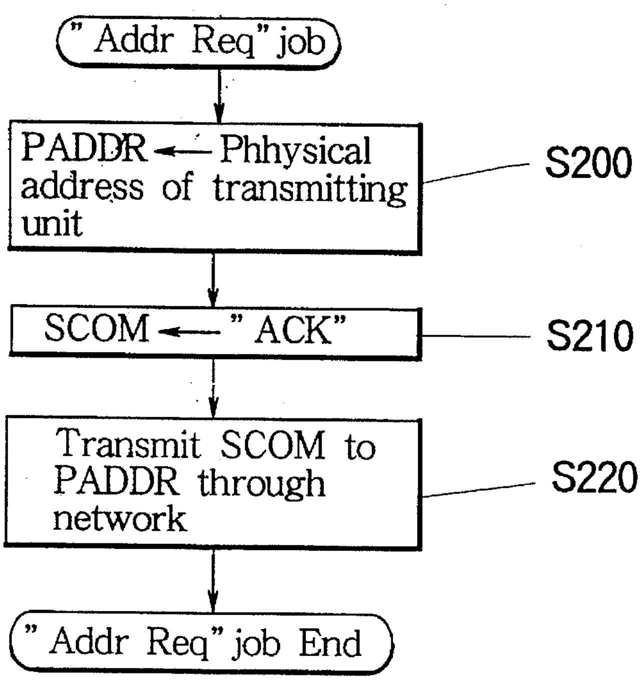
FIG. 11 is a flowchart showing an address request job process.
Figure 12:
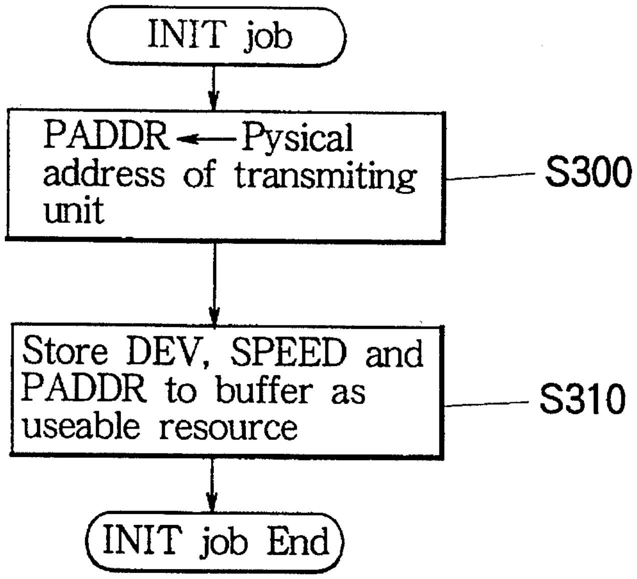
FIG. 12 is a flowchart showing an initial job process.

The provisional job executed in Step S130 includes an address request job (Addr Req job) process shown in FIG. 11, and an initial job (INIT job) process shown in FIG. 12. Referring first to FIG. 11, in the address request job process, first Step S200 is undertaken such that the main unit extracts a physical address from the received packet which is transmitted by the slave unit. The extracted physical address of the transmitting slave unit is set to "PADDR". Then, in Step S210, the main unit sets or writes a message "ACK" to a transmitting command "SCOM". Further, in Step S220, the main unit transmits SCOM to PADDR in the network. The destined slave unit receives SCOM to thereby recognize that the main unit is activated normally and to obtain the physical address of the main unit. Only one main unit is involved in the system, and therefore its logical address is given (0, 0) in this embodiment.

Referring to FIG. 12, in the initial job process, Step S300 is undertaken to set the address of the transmitting slave unit to PADDR. Then, Step S310 is undertaken to store data DEV and SPEED which are transmitted from the slave unit by means of a command "INIT". The data DEV indicates a kind of the external device connected to the slave unit. The other data SPEED indicates an information processing speed of a CPU contained in the slave unit. The main unit determines based on these data DEV and SPEED as to what job or function should be allocated to the respective unit in Step S160.

Figure 13:
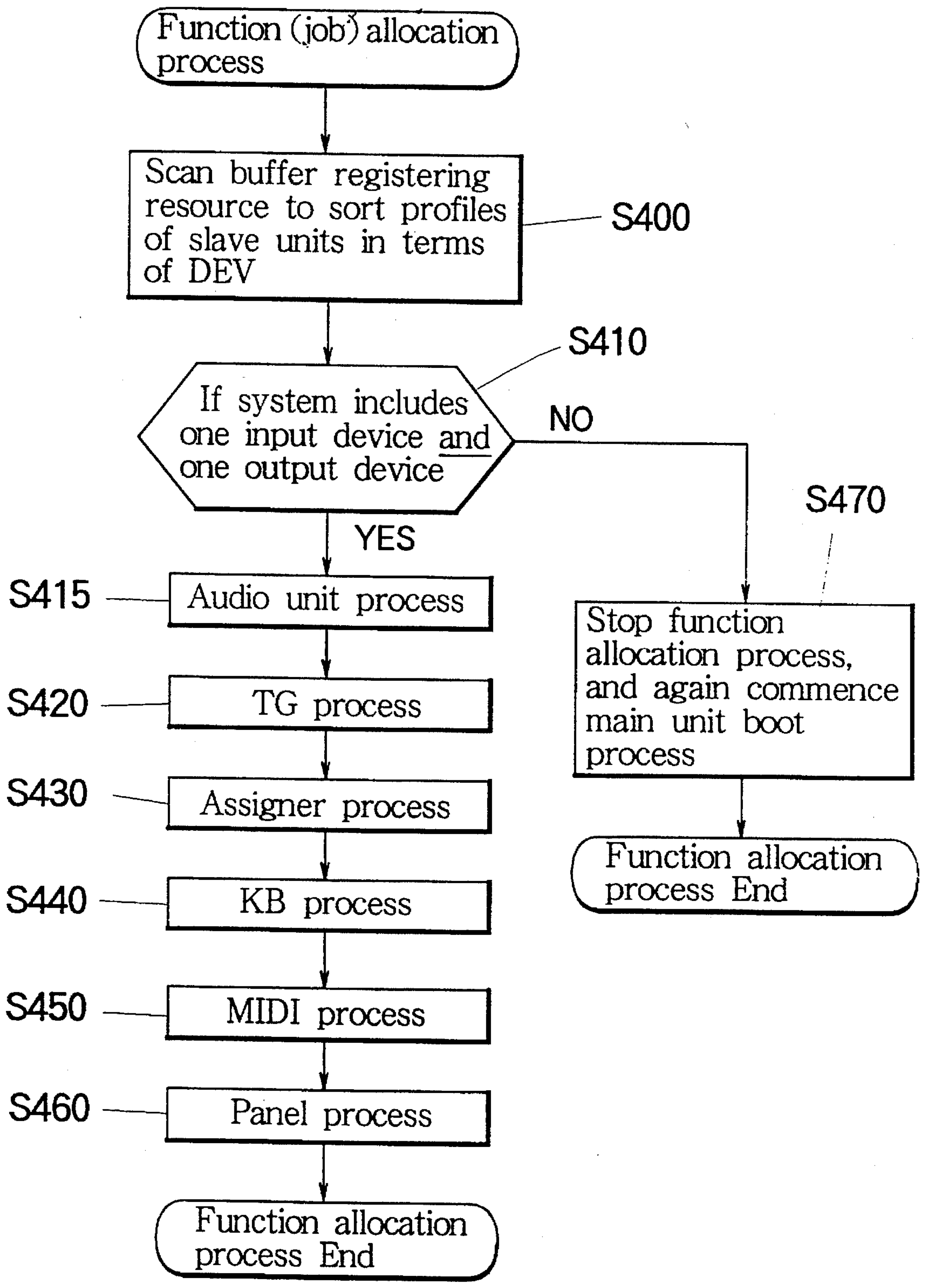
FIG. 13 is a flowchart showing a function assignmnent process.

Referring to FIG. 13 which shows detail of the function allocation process by Step S160, first Step S400 is undertaken to scan the buffer which registers the system resources to sort the profile information of the respective units collected by Step S310 of FIG. 12 in terms of DEV which indicates the kinds of the connected external devices. Then, Step S410 is undertaken to check as to if the system includes at least one input device such as a keyboard and a MIDI interface and at least one output device. If the system does not meet this minimum condition, the system cannot perform a musical operation. Thus, the routine branches to Step S470 to again commence the main unit booting process shown in FIG. 10. By this, the main unit can collect information of a late unit which is booted belatedly.

On the other hand, if the check result of Step S410 confirms that the musical system meets the minimum condition for the electronic musical instrument, following Steps S415–S460 are successively executed. First, an audio unit process is carried out in Step S415. In this process, the main unit retrieves an application program for use in the audio unit from the program server module. The retrieved program is loaded into a desired universal unit so that this unit is functionally specialized to the audio unit. Further, the physical address of the audio unit is memorized in the main unit, and a suitable logical address is set. The memorized physical address is later needed for controlling the tone generating (TG) units to correctly transmit their outputs to the audio unit which is identified by the memorized physical address by the TG unit. In similar manner, TG process, assigner process, KB process, MIDI process and panel process are effected in Steps S420–S460, respectively, thereby completing the desired job or function allocation process.

Figure 14:
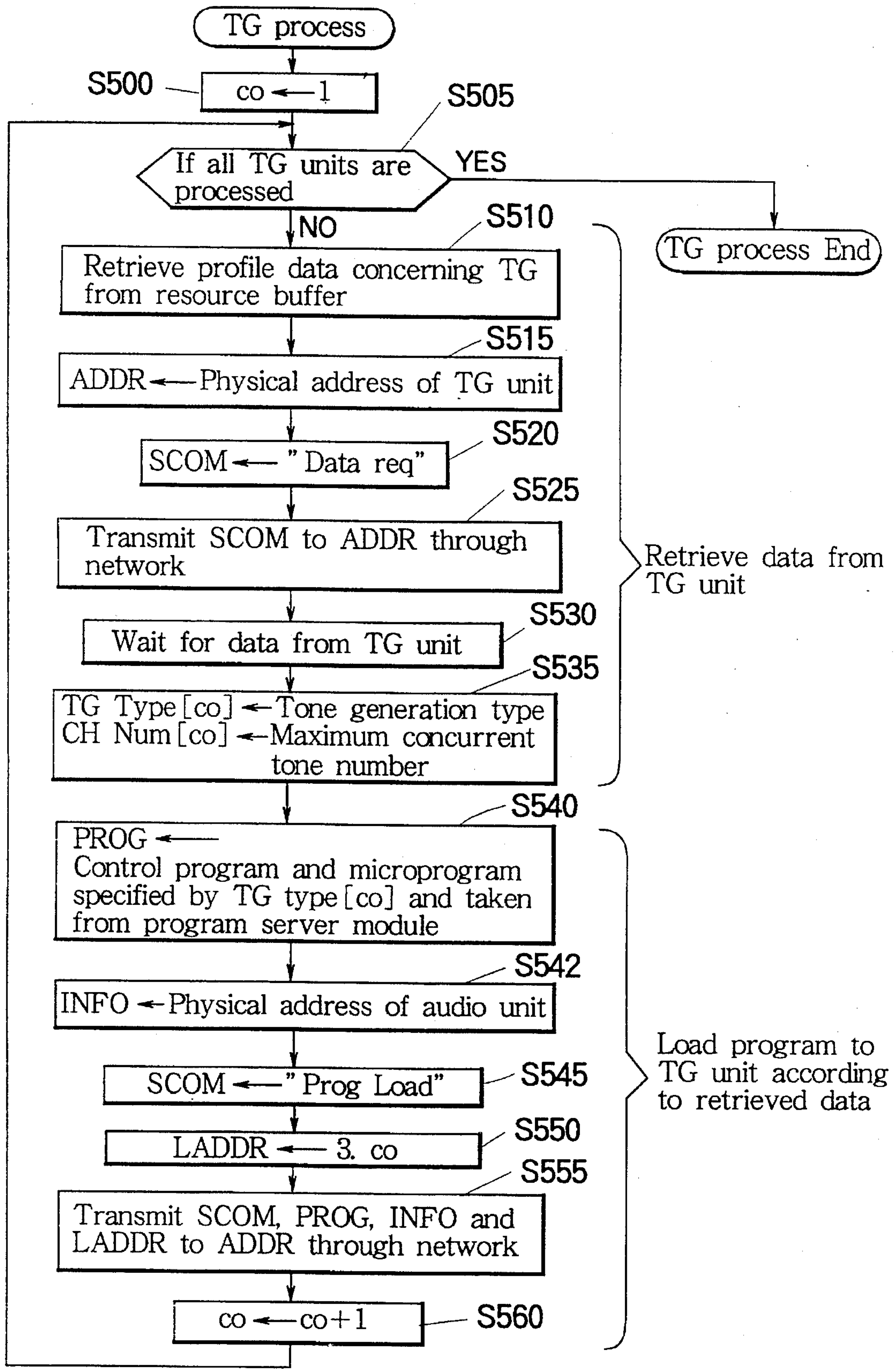
FIG. 14 is a flowchart showing a tone generator (TG) process.

Referring to FIG. 14 which shows a detail of the TG process called at Step S420 of FIG. 13, first Step S500 is undertaken to set a counter "co" to "1". The value of this counter co is used as a lower order data of the logical address. Since the value "0" of the lower order data is used to indicate broadcasting, the next value "1" is initially set to the counter co. Next, Step S505 is undertaken to check as to if the buffer reserves a data of tone generating units which are not yet processed. At this moment, the system is just booted and it is confirmed by Step S410 of FIG. 13 that there is at least one tone generating unit. Thus, the routine advances to Step S510 where one profile data having DEV="TG" is retrieved from the buffer. Further, Step S515 is undertaken to set or write the physical address of the concerned tone generating unit to ADDR.

Next, Step S520 is undertaken to set or write a message "Data Req" to a transmitting command SCOM in order to obtain detailed information from that tone generating unit.

Then, Step S525 is undertaken to transmit SCOM to ADDR through the network. Consequently, SCOM is received by the tone generating unit halving the physical address ADDR which is retrieved from the buffer of the main unit. Then, this tone generating unit transmits back its own tone generation type and maximum concurrent tone numbers to the main unit. The tone generation type is classified into a waveform memory type, an FM tone generation type and a DSP simulation type, the last of which generally requires a microprogram for the tone generation. After waiting for the data from that tone generator unit in Step S530, Step S535 is undertaken such that the main unit memorizes the received tone generation type as "TG Type" which is labeled by the counter value co="1", and also memorizes the received maximum concurrent tone number as "CH Num" which is also labeled by the counter value co="1". Consequently, the detailed information is retrieved from one tone generating unit.

Then, the main unit loads an adequate control program to the tone generating unit according to the data retrieved from that tone generating unit. First, Step S540 is undertaken to retrieve a control program and a microprogram, if any, from the program server module according to the memorized TG Type. These retrieved programs are set to a register PROG. Then, Step S542 is undertaken to set the physical address of the audio omit which is reserved by Step S415 of FIG. 13, as additional information INFO. Further, Step S545 is undertaken to set a message "Prog Load" to a transmitting command SCOM. Moreover, Step S550 is undertaken to set (3, co=1) as the logical address LADDR of this tone generating unit. Finally, Step S555 is undertaken to transmit the set of SCOM, PROG, INFO and LADDR to ADDR through the network. Subsequently, Step S560 is undertaken to increment the counter value co to co+1, thereafter returning to Step S505 to repeat the above described routine until all of the tone generating units are processed. By such a manner, the logical address (3, co) is given to the respective tone generating unit. Further, the adequate control program and the microprogram are loaded according to the tone generation type and the maximum concurrent tone number of the tone generating unit.

When the information taken from the tone generating unit indicates that the tone generating unit is the simulation type, the main unit supplies a microprogram to that tone generating unit so as to produce a musical tone of a certain timbre such as a piano tone. This is to avoid missing of the tone generation when the music instrument is turned on. However, the tone generating unit of the waveform memory type does not need a microprogram for the musical tone synthesis.

Referring to FIG. 5, the higher order data of the logical address is defined correspondingly to the kind of the function or job of the module or unit. Namely, the main unit is given "0", the keyboard unit is given "1", the panel switch unit is given "2", the tone generating unit is given "3", the MIDI interface unit is given "4", the assigner unit is given "5", the audio unit is given "6", the program server module is given "7", and absent module is given "8". As listed in FIG. 5, the modules or units are labeled by functional codes such as the main unit is labeled by "MAIN". The codes marked by "*," are utilized for recognition of the modules at the booting of the system. The complete logical address is composed of one higher order data listed in the FIG. 5 table and one lower order data which is set by the value co of the counter. Consequently, modules or units having the same function are given respective logical addresses in which the higher order data is identical but the lower order data is different.

Figure 15:
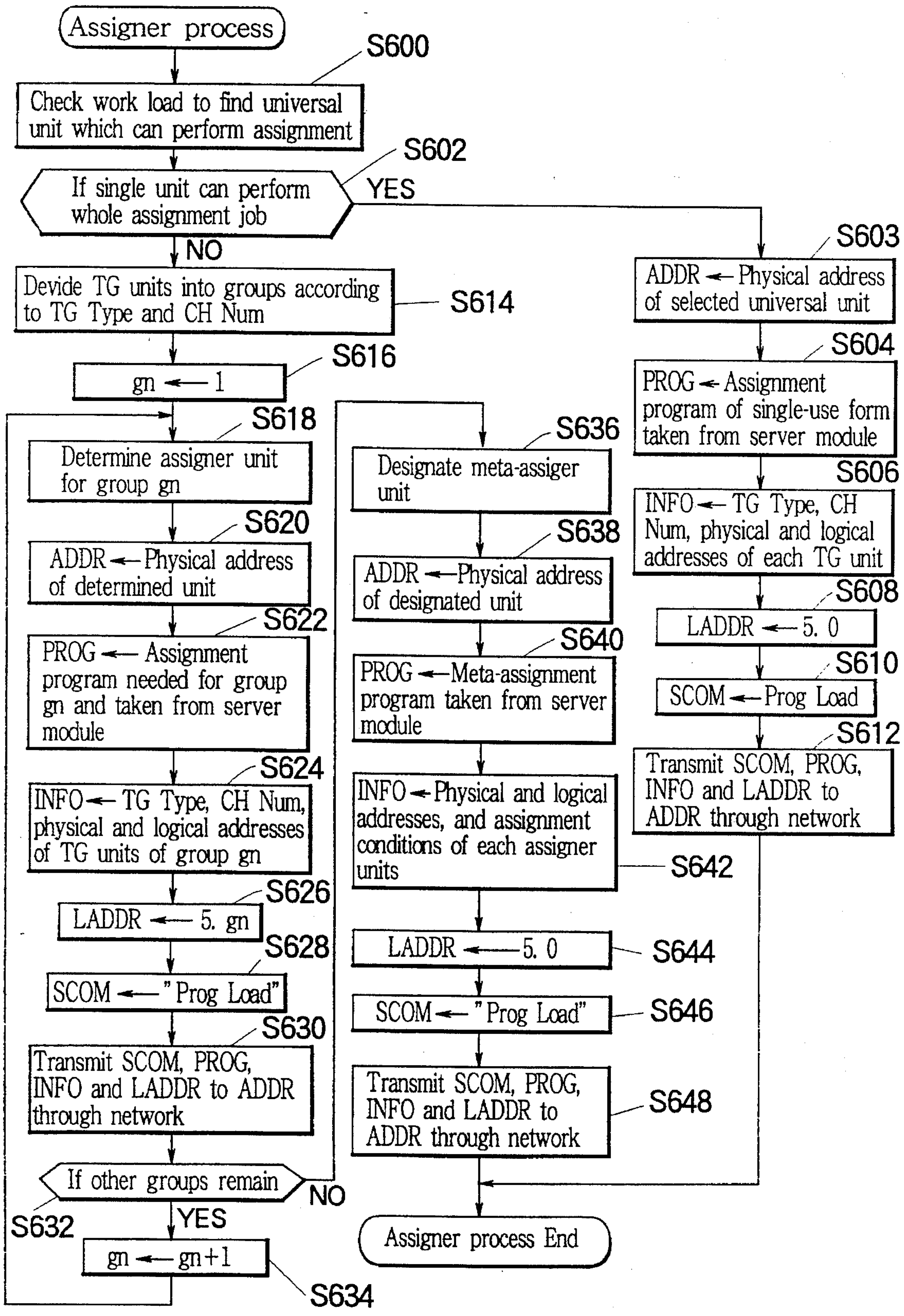
FIG. 15 is a flowchart showing an assigner process.

Next, FIG. 15 shows a flowchart of the assigner process. Generally, the tone generation command assignment process includes searching for a vacant channel, and further searching another channel of a minimum tone volume if the vacant channel is not available. This searching process requires scanning of all channels one by one. Therefore, the more the number of channels, the longer the time required for the assignment. In such a case, the assignment process is divided to shorten the processing time. In this embodiment, the main unit initially checks universal units which can perform the assignment function. Then, if the total assignment work is relatively simple, the assignment program is loaded into one universal unit to allocate the whole assignment job to that universal unit. On the other hand, if one unit cannot perform the whole assignment job due to an excessive number of tone generating channels, a plurality of tone generating units are divided into groups and each group is managed by one assigner unit. Further, a meta-assigner unit is provided to manage or supervise a multiple of the assigner units. In allocating the assignment job or the meta-assignment job, the main unit checks the processing speed data SPEED and the work load of the respective modules or units, obtained by Step S310, to specify a most workable one to the assigner unit or the meta-assigner unit.

In practice, first Step S600 is undertaken to check work load of each unit to find ones which can perform the assignment job. Further, Step S602 is undertaken to judge as to if a number of tone generating channels is relatively small and a single unit can manage the whole channels. If YES, Step S603 is undertaken to set the physical address of a selected unit to ADDR. Then, Step S604 is undertaken to retrieve an assignment program of the single-use form from the program server module, and to set the retrieved program to the register PROG. Further, Step S606 is undertaken to set "TG Type", "CH Num", and physical and logical addresses of each tone generating unit to a register as additional information INFO. Step S608 is undertaken to set the logical address LADDR of the selected assigner unit to (5, 0). Step S610 is undertaken to set "Prog Load" to a transmitting command SCOM. Lastly, Step S612 is undertaken to transmit SCOM, PROG, INFO and LADDR, to ADDR through the network, thereby allocating the assignment job to the single universal unit. The single assigner unit is labeled by the logical address (5, 0) which has the lower order data "0", because it is not necessary to logically discriminate the single assigner unit since tone generation commands are simply fed to the single assigner unit.

On the other hand, if the check result of Step S602 shows that the total assignment job is too heavy for one assigner unit, subsequent Step S614 is undertaken to divide the tone generating units into a multiple of groups according to the tone generation type and the channel number of the respective tone generating units. For example, the tone generating units are divided into one group of the DSP simulation type and another group of the waveform memory type. Alternatively, the tone generating units are grouped into one for handling a manual live performance by KB and another for handling an automatic recorded performance. Otherwise, the tone generating units may be simply divided into two groups.

Then, Step S616 is undertaken to set a group number gn to "1". Further, Step S618 is undertaken to determine one unit which performs the assignment job of the tone generating units belonging to the group identified by gn=1. Step S620 is undertaken to set the physical address of the determined or selected unit to ADDR. Then, Step S622 is undertaken to retrieve from the program server module an assignment program needed for managing the group number gn of the tone generating units. The retrieved program is set to the register PROG. Next, Step S624 is undertaken to set "TG Type", "CH Num", and physical and logical addresses of the tone generating units included in the group gn to the register as the additional information INFO. Next, Step S626 is undertaken to set the logical address LADDR of the assigner unit which manages the group gn to (5, gn=1). Step S628 is undertaken to set the transmitting command SCOM with "Prog Load". Lastly, Step S630 is undertaken to transmit SCOM, PROG, INFO and LADDR to ADDR through the network. Subsequently, Step S632 is undertaken to check as to if other groups remain. If YES, Step S634 is undertaken to increment gn to gn+1, thereby returning to Step S618. Then, the same routine is repeatedly executed until there is no remaining group.

Then, the routine advances to designation of a meta-assigner unit. Namely, Step S636 is undertaken to designate one universal unit to the meta-assigner. Step S638 is undertaken to set the physical address of the designated unit to ADDR. In Step S640, a meta-assignment program is retrieved from the program server module, and is set to the register as PROG. Next in Step S642, the physical and logical addresses of the assigner units and the assignment conditions thereof are set to the register as additional information INFO. Then, in Step S644, the logical address of the designated meta-assigner unit is set to LADDR=(5, 0). In subsequent Step S646, the transmitting or sending command SCOM is set with "Prog Load". Lastly in Step S648, SCOM, PROG, INFO and LADDR are sent to ADDR through the network. Consequently, the designated unit is allocated with the meta-assignment job to manage and supervise the set of the assigner units.

FIG. 7 shows an example of the assignment condition by the meta-assigner unit. This table lists four groups managed by the meta-assigner unit. The first group handles tone generation commands fed from the keyboard. Namely, the meta-assigner unit passes the tone generation commands from the keyboard to a first assigner unit which is identified by the physical address indicated at the first group. The second group handles tone generation commands from the automatic performance unit. The third group handles tone generation commands from first through eighth channels of MIDI. The fourth group handles tone generation commands from ninth through sixteenth channels of MIDI.

Figure 16:
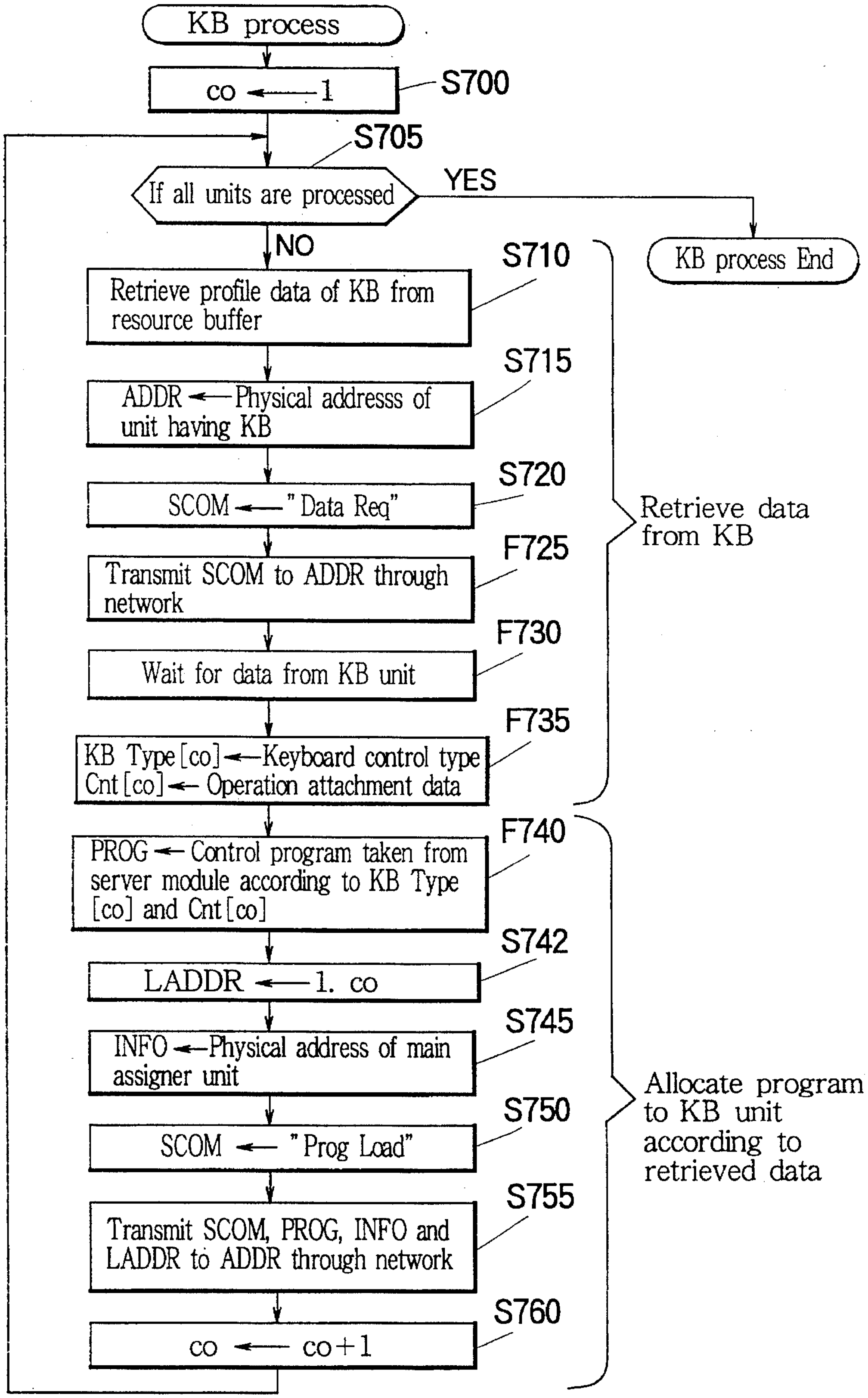
FIG. 16 is a flowchart, showing a keyboard (KB) process.

FIG. 16 shows the keyboard (KB) process. The keyboard includes various types such as those having a touch response function, an after-touch function and a pitch bend wheel. Therefore, the main unit checks a characteristic profile data of the keyboard so as to allocate thereto a workable program. First Step S700 is undertaken to set the counter co to "1". The value of this counter co is used as a lower order data of the logical address. Since the value "0" of the lower order data is used to indicate broadcasting, the next value "1" is initially set to the counter co. Next, Step S705 is undertaken to check as to if the buffer reserves a data of keyboard units which are not yet processed. At this moment, the system is just booted and it is confirmed by Step S410 of FIG. 13 that there is at least one keyboard unit. Thus, the routine advances to Step S710 where one profile data having DEV= "KB" is retrieved from the buffer. Further, Step S715 is undertaken to set the physical address of the concerned unit to ADDR.

Next, Step S720 is undertaken to set a message "Data Req" to a transmitting command SCOM in order to obtain detailed information from that unit having the keyboard. Then, Step S725 is undertaken to transmit SCOM to ADDR through the network. Consequently, SCOM is received by the keyboard unit having the physical address ADDR which is retrieved from the buffer of the main unit. Then, this unit having the keyboard transmits back its keyboard control type and other data concerning an operating attachment such as a wheel to the main unit. After waiting for the data from that keyboard unit at Step S730, Step S735 is undertaken such that the main unit memorizes the received keyboard control type as "KB Type" which is labeled by the counter value co="1", and also memorizes the received operation attachment data as "Cnt" which is also labeled by the counter value co="1". Consequently, the detailed data is retrieved from one keyboard unit.

Then, the main unit loads an adequate control program to the keyboard unit according to the data retrieved from that unit. First, Step S740 is undertaken to retrieve a control program from the program server module according to the memorized KB Type and Cnt. This retrieved program is set to the register PROG. Then, Step S742 is undertaken to set the logical address of this unit to LADDR=(1, co=1). Further, Step S745 is undertaken to set the physical address of the main assigner unit, which is memorized by the assigner process of FIG. 15, to the register INFO as additional information. The main assigner unit should be a single assigner unit, or a meta-assigner unit which manages a plurality of assigner units. Then, Step S750 is undertaken to set a message "Prog Load" to a transmitting command SCOM. Finally, Step S755 is undertaken to transmit the set of SCOM, PROG, INFO and LADDR to ADDR through the network. Subsequently, Step S760 is undertaken to increment the counter value co to co=1, thereafter returning to Step S705 to repeat the above described routine until all of the remaining units are processed.

Figure 17:
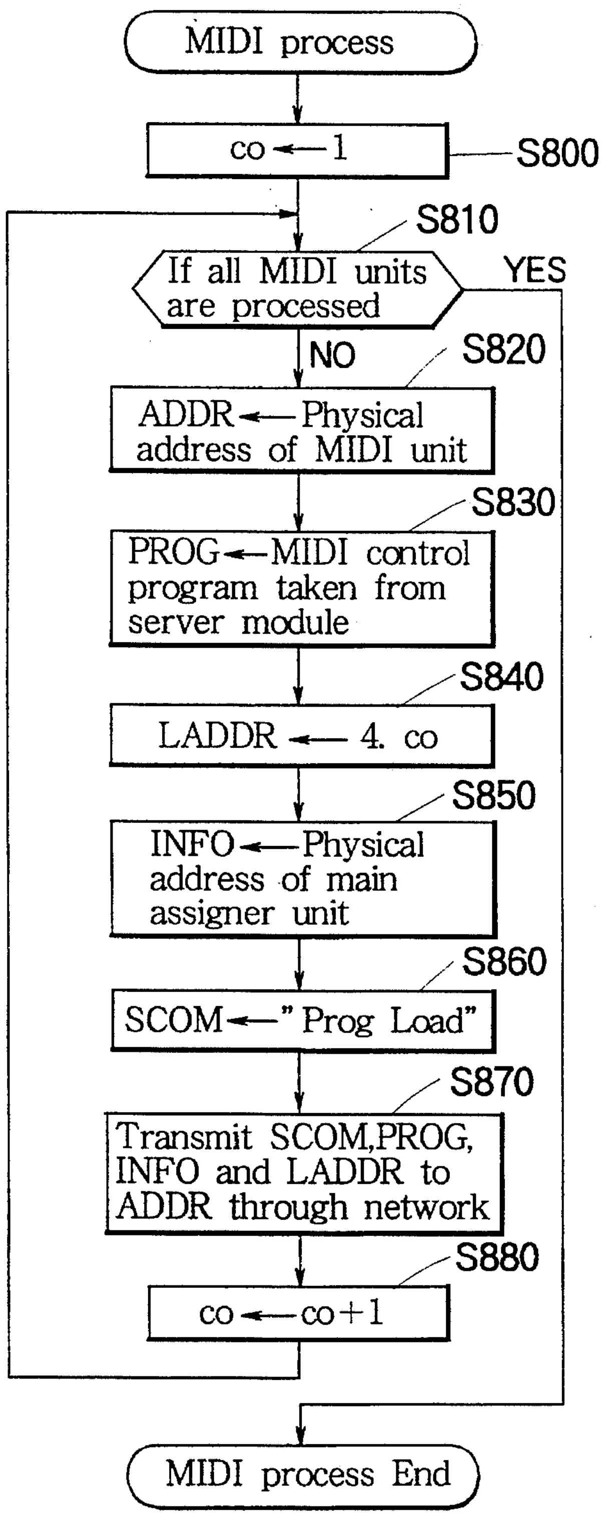
FIG. 17 is a flowchart showing a MIDI process.

Next, FIG. 17 shows a detail of the MIDI process. First, Step S800 is undertaken to set the counter co to "1". The value of this counter is used as the lower order data of the logical address. Since the value "0" of the lower order data is used to indicate broadcasting, the subsequent value "1" is initially set to the counter. Next, Step S810 is undertaken to check as to if the buffer of the main unit reserves a data of MIDI units which are not yet processed. If SO, Step S820 is undertaken to set the physical address of one of the MIDI units to ADDR. Then, Step S830 is undertaken to retrieve from the program server module an adequate MIDI control program, which is then set into the register PROG. Step S840 is undertaken to set the logical address of the MIDI unit to LADDR (4, co=1). Then, Step S850 is undertaken to set the physical address of the main assigner unit, which is provisionally memorized in the assigner process of FIG. 15, to the register INFO as additional information. Further, Step S860 is undertaken to set the transmitting command SCOM with "Prog Load". Lastly, Step S870 is undertaken to transmit time set of SCOM, PROG, INFO and LADDR to ADDR through the network. Thereafter, Step S880 is undertaken to increment the counter value co to co+1, thereby returning to Step S810 to repeat the above routine until all of the MIDI units are processed.

In the above described KB process and MIDI process, the physical address of the main assigner unit is fed to the keyboard unit and the MIDI unit. By this, the keyboard unit and the MIDI unit can communicate with the main assigner unit by using the physical address thereof. The physical address is readily detected by a hardware, i.e., an interface of the network. Otherwise, these input units may communicate with the main assigner unit with using the logical address (5, 0) thereof. However, the logical address is checked by a specific address check routine, which would incur an additional work load to the network.

Figure 18:
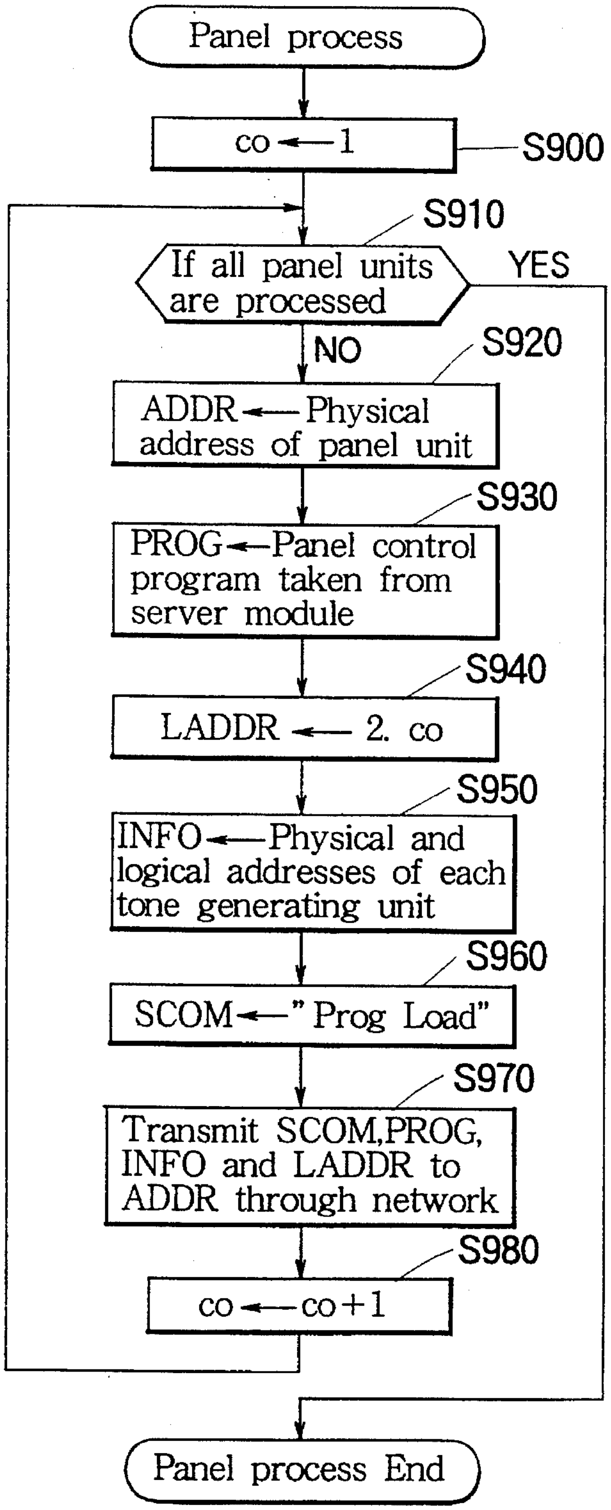
FIG. 18 is a flowchart showing a panel process.

Next, FIG. 18 shows a detail of the panel process. First Step S900 is undertaken to set the address counter co to "1". The value of this counter is used as the lower order data of the logical address. Since the value "0" of the lower order data is used to indicate broadcasting, the subsequent value "1" is initially set to the address counter. Next, Step S910 is undertaken to check as to if the buffer of the main unit reserves a data of panel units which are not yet processed. If SO, Step S920 is undertaken to set the physical address ADDR of one of the panel units which are connected to operation panels. Then, Step S930 is undertaken to retrieve from the program server module an adequate panel control program, which is then set into the register PROG. Step S940 is undertaken to set the logical address of the panel unit to LADDR (2, co=1). Then, Step S950 is undertaken to set the physical address or the logical address of each tone generating unit to the register INFO as additional information. Further, Step S960 is undertaken to set the transmitting command with "Prog Load". Lastly, Step S970 is undertaken to transmit the set of SCOM, PROG, INFO and LADDR to ADDR through the network. Thereafter, Step S980 is undertaken to increment the counter value co to co+1, thereby returning to Step S910 to repeat the above routine until all of the panel units are processed.

Figure 19:
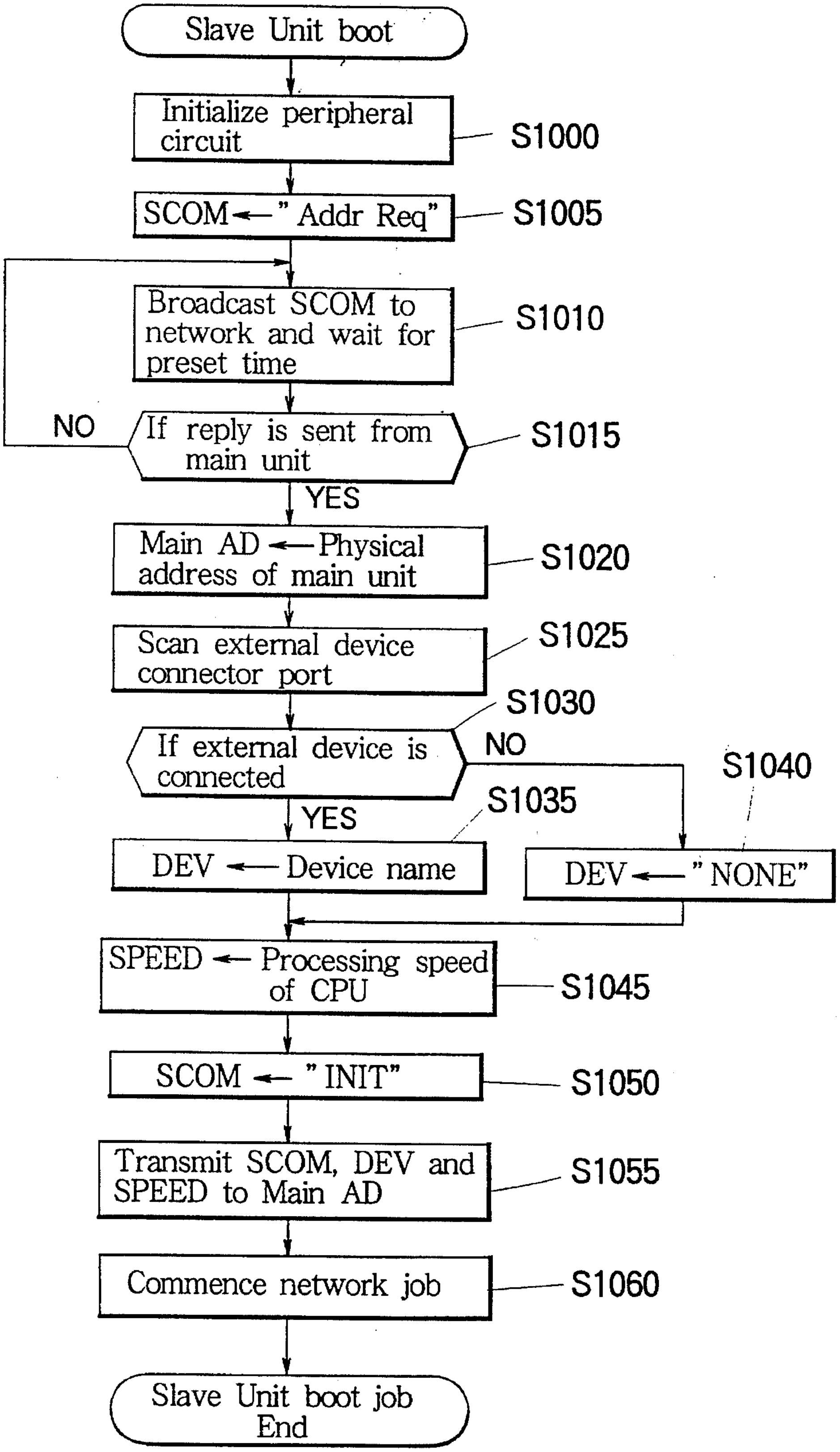
FIG. 19 is a flowchart showing a slave unit boot process.

Next, detailed description is given for the operation of each slave unit. FIG. 19 shows a boot process of the slave unit. First, Step S1000 is undertaken to initialize peripheral circuits. Thereafter, Step S1005 is undertaken to set a message "Addr Req" to the transmitting SCOM. Step S1010 is undertaken to broadcast SCOM to the network. Then, the slave unit waits for a reply from the main unit within a preset time. If Step S1015 detects the reply from the main or master unit, Step S1020 is undertaken to memorize the physical address of the responding main unit as "Main AD".

Then, the slave unit transmits its own data to the network. First, Step S1025 is undertaken to scan its own external device connection port. If Step S1030 detects that an external device is actually connected, Step S1035 is subsequently undertaken to set a device name or code of the connected external device to an internal register DEV, thereby advancing to Step S1045. When the external device is not connected, Step S1040 is undertaken to set "NONE" to the register DEV, thereby proceeding to Step S1045. In Step S1045, the slave unit sets a processing speed of its own CPU to an internal register SPEED to indicate its rated throughput. Then, Step S1050 is undertaken to set an initialization request message "INIT" to the sending command register SCOM. Next, Step S1055 is undertaken to transmit the set of SCOM, DEV and SPEED to Main AD in the network. The data SPEED can be used to judge as to if the slave unit should be allocated with the assignment job or the meta-assignment job. Further, if one slave unit is connected to different external devices such as a keyboard KB and an operation panel PN, that slave unit sets "KB/PN" to DEV to register the two external devices. Lastly, Step S1060 is undertaken to activate a network job for admitting a program and data fed from the main unit, thereby finishing the boot process of the slave unit.

Figure 20:
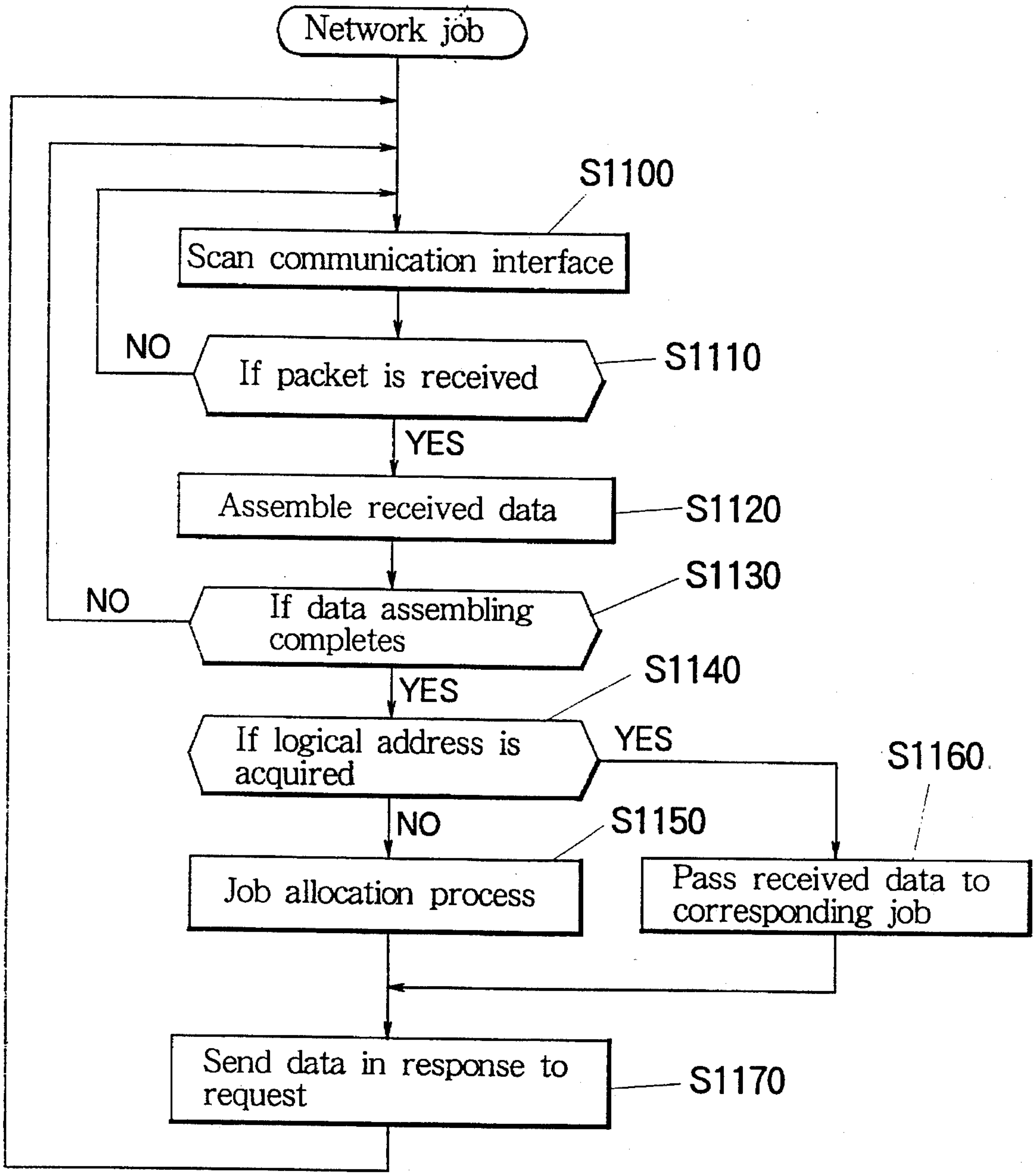
FIG. 20 is a flowchart showing a network job process.

FIG. 20 shows a detail of the network job process executed by Step S1060 of FIG. 19. First, Step S1100 is undertaken to scan the communication interface of the slave unit. Step S1110 is undertaken to deck as to if a data packet is received by the interface. The loop of Steps S1100 and S1110 is repeated to scan the interface until a packet is received. Upon receipt of the packet, Step S1120 is undertaken to organize or assemble the received data. For example, a great data volume such as a control program may be dividedly sent by a plurality of packets. Thus, the received data is rearranged to restore an original form. Accordingly, the interface is repeatedly scanned to successively admit a train of packets until the data is completely assembled.

When Step S1130 judges that the received data is completely restored, Step S1140 is undertaken to check as to if the slave unit acquires its own logical address. The logical address is given by the main unit concurrently with loading of a control program. Therefore, the slave unit possesses the logical address after the loading of the program. At this moment, the slave unit is placed in the program loaded state, subsequent Step S1160 can be undertaken to pass the received data to a corresponding job. On the other hand, if the logical address is not yet acquired, the slave unit is held in a program unloaded state. Thus, Step S1150 is undertaken to carry out a job allocation process including the loading of an adequate control program. Next, Step S1170 is undertaken to transmit a data to a requesting unit, if any, after completing the control program loading. For example, as a consequence of executing the allocated job, the slave unit may prepare a plurality of packets according to a data length to be transmitted, and may set a physical address of a destined unit. By such a manner, the network job process includes not only the data receipt but also the data transmission. Therefore, the network job process is executed not only at the booting of the slave unit, but also during a regular routine work.

Figure 21:
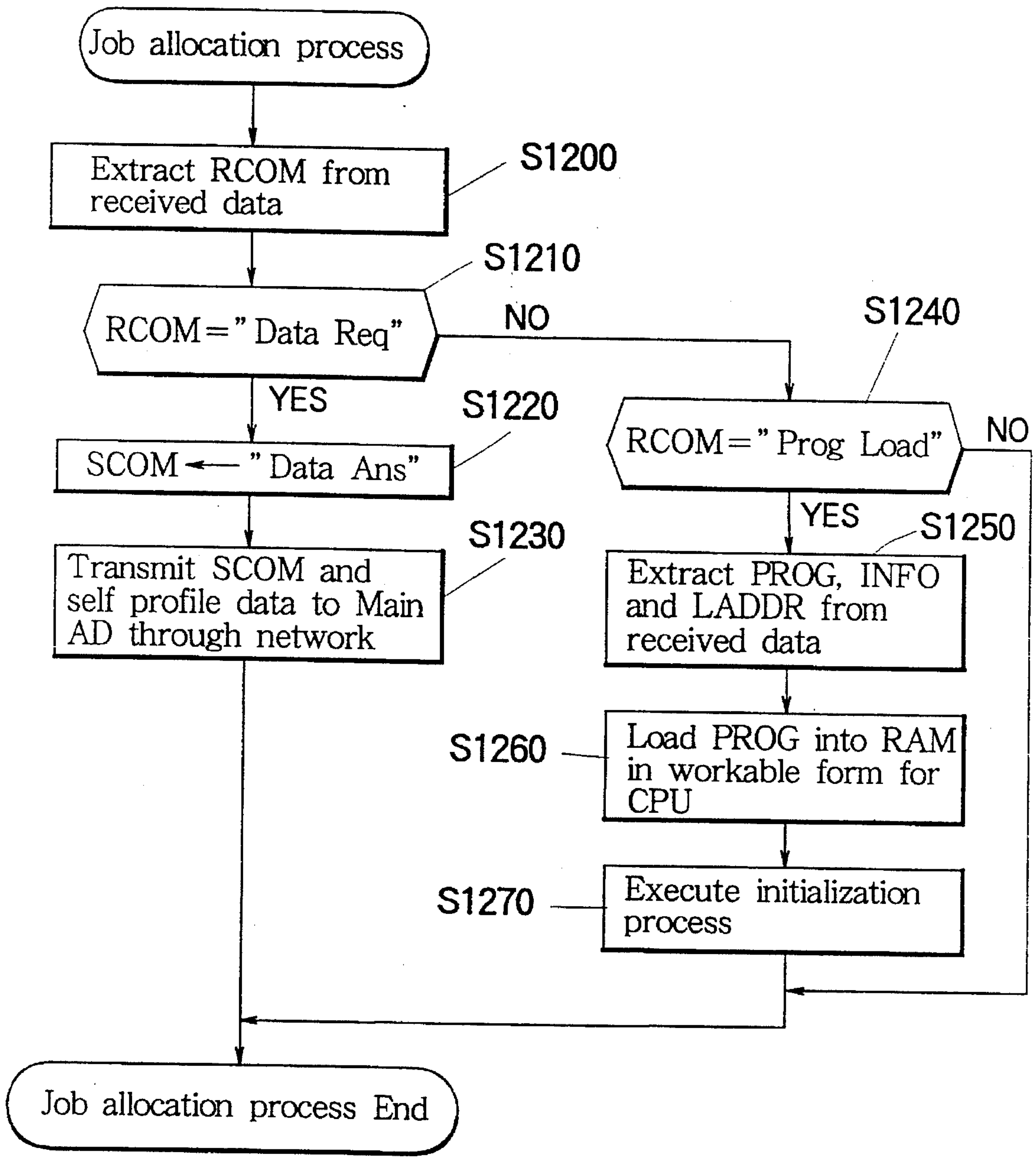
FIG. 21 is a flowchart showing a job allocation process.

Next, FIG. 21 shows a detail of the job allocation process executed by Step S1150 of FIG. 20. First, Step S1200 is undertaken to extract a receiving command RCOM from the received data which is assembled by Step S1120. Step S1210 is undertaken to check as to if RCOM indicates "Data Req". If YES, Step S1220 is undertaken to set "Data Ans" to a transmitting command SCOM. Step S1230 is undertaken to transmit the processing speed data SPEED and the connected external device data DEV together with SCOM to Main AD in the network.

If Step S1210 indicates that RCOM is not "Data Req", Step S1240 is subsequently undertaken to check as to if RCOM indicates "Prog Load". If YES, Step S1250 is undertaken to extract the program PROG, the additional information INFO and the logical address LADDR from the received data. Then, Step S1260 is undertaken to load the program PROG to the internal RAM in a workable form for the internal CPU. For example, if the slave unit simply loads therein a tone generation assignment program as it is, the slave unit cannot yet work as an assigner unit because a maximum concurrent tone number or other basic data is not actually introduced into the program. Therefore, the loading process of Step S1260 includes modification of the initial program according to the received INFO so as to enable the slave unit to correctly scan and manage the tone generation channels. Lastly, Step S1270 is undertaken to carry out an initialization job. This initialization job is programmed in the control program loaded by Step S1260. Consequently, the job allocation process is finished as in the case where the receiving command RCOM does not indicate "Prog Load".

Figure 22:
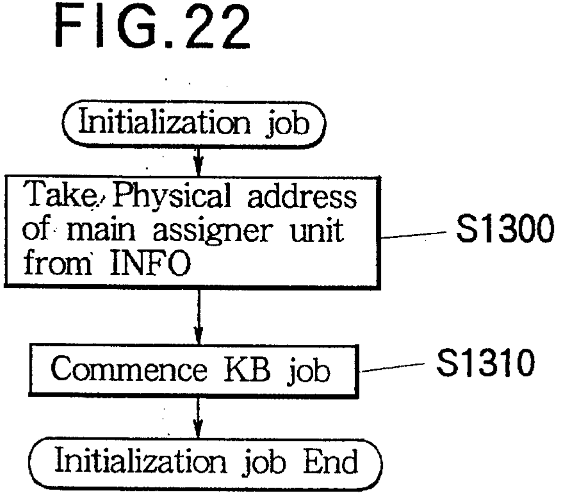
FIG. 22 is a flowchart showing an initialization job of a scanning unit.

Hereinafter, detailed description is given for operation of various kinds of the slave units. First, FIG. 22 shows the initialization job of the scanner unit. First, Step S1300 is undertaken to take the physical address of the main assigner unit from the additional information INFO, in order to readily send a scanned data such as a key code to the main assigner unit. Then, Step S1310 is undertaken to activate the KB job, thereby finishing the initialization job.

Figure 23:
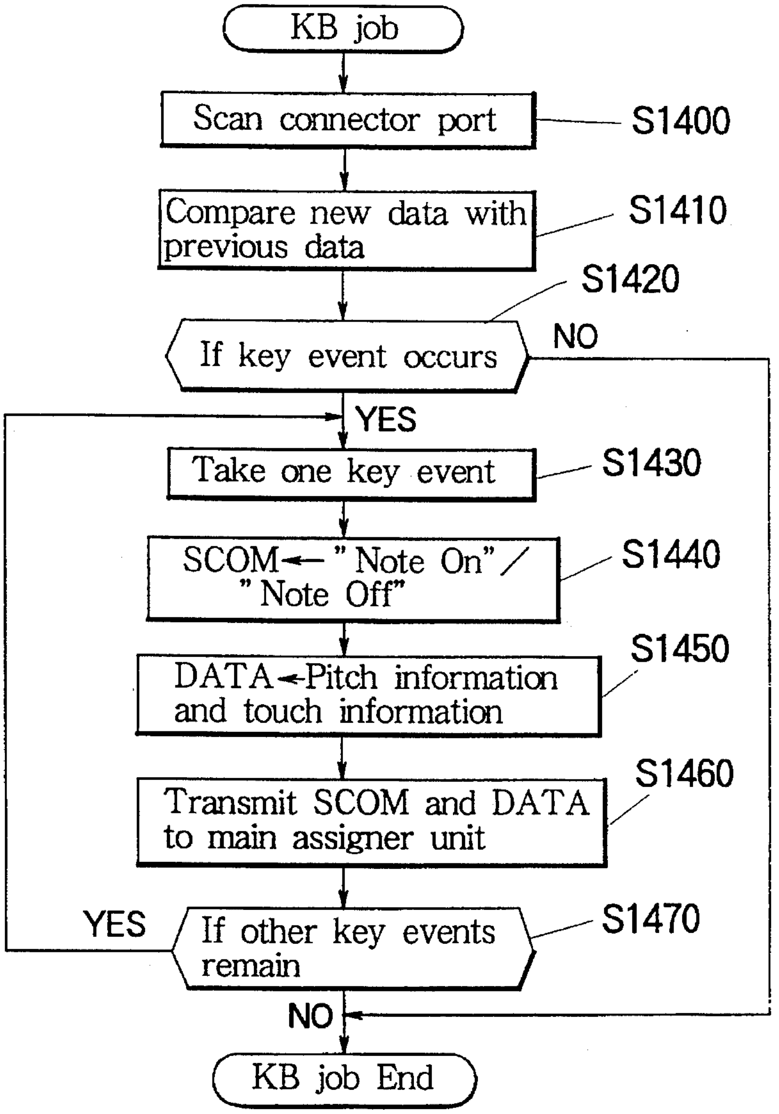
FIG. 23 is a flowchart showing a KB job.

FIG. 23 shows a detail of the KB job. First, Step S1400 is undertaken to scan the external device connector port.

Step S1410 is undertaken to compare a new scanned data with an old or previous scanned data. Step S1420 is undertaken to check as to if a key event occurs. The key event is detected when the new data does not coincide with the old data. In such a case, Step S1430 is undertaken to select one key event if a plurality of key events are concurrently detected. The selected key event is sent to the main assigner unit. Namely, Step S1440 is undertaken to set "Note On" or "Note Off" message as the transmitting command SCOM. Step S1450 is undertaken to set pitch information and touch information of the key on event to an internal register DATA. Step S1460 is undertaken to transmit SCOM and DATA to the physical address of the main assigner unit, which is memorized by the previous KB scanner unit initialization job. Thereafter, Step S1470 is undertaken to check as to if other key events remain. If YES, the routine returns to Step S1430 to repeat the above described process. Lastly, all of the concurrent key events are processed to thereby finish the KB job as in the case where Step S1420 judges that no key event is taken place. This KB job is repeatedly executed by interruption.

Figure 24:
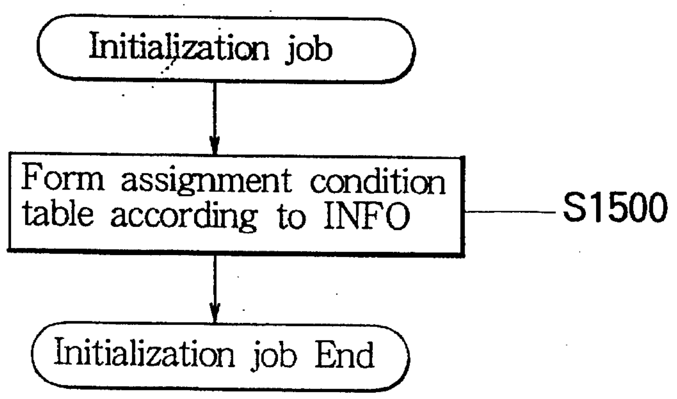
FIG. 24 is a flowchart showing an initialization job of the meta-assigner.

FIG. 24 shows a detail of the meta-assigner initialization job. Step S1500 is undertaken to form the assignment condition table as shown in FIG. 7 according to the received additional information INFO, thereby finishing the initialization job.

Figure 25:
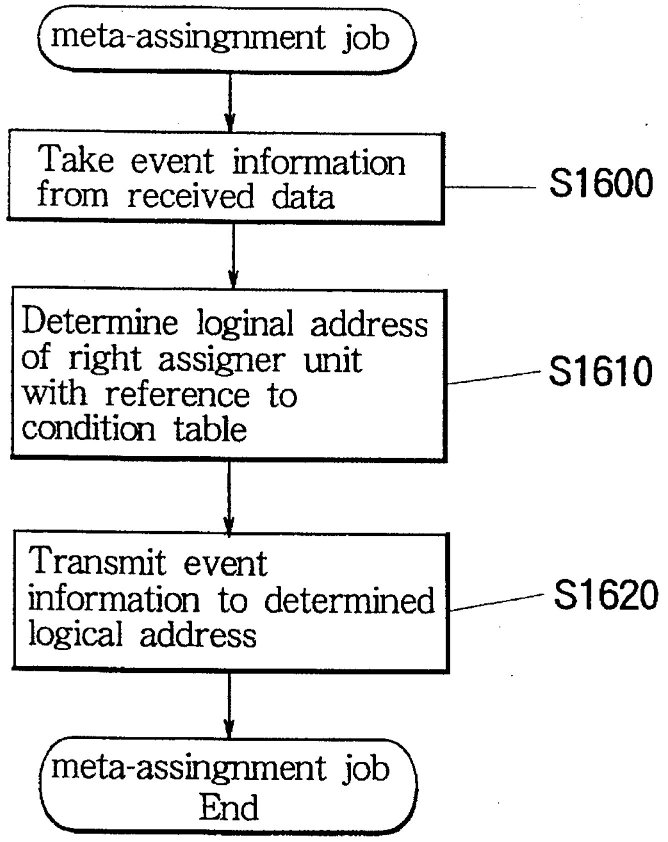
FIG. 25 is a flowchart showing a meta-assignment job.

FIG. 25 shows a detail of the meta-assignment job. The meta-assigner unit receives a noteon signal and a noteoff signal from the keyboard module or else. First, Step S1600 is undertaken to extract event information from the received data. Step S1610 is undertaken to determine a logical address of one assigner unit with reference to the assignment condition table formed by the meta-assigner initialization job. Then, Step S1620 is undertaken to pass the event information to the determined logical address. In this case, the information is actually transmitted to the network by Step S1170 of the network job process shown in FIG. 20. Therefore, in Step S1620, the logical address is converted into a corresponding physical address with reference to the table. Thereafter, a packet of the event information is formed, and is transmitted to the converted physical address.

Figure 26:
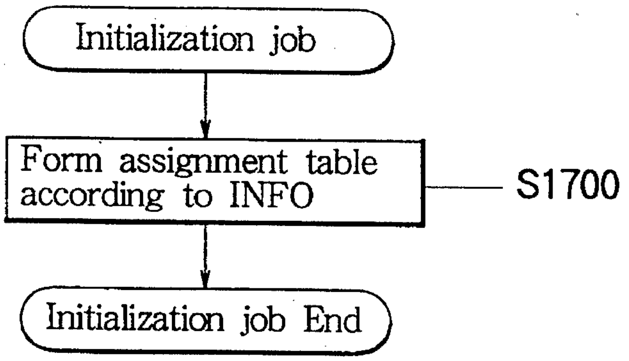
FIG. 26 is a flowchart showing an initialization job of the assigner.

Next, FIG. 26 shows a detail of the assigner initialization job. Step S1700 is undertaken to produce an assignment table as shown in FIG. 8 according to the provided additional information INFO, thereby finishing this initialization job. According to the assignment table of FIG. 8, the assigner unit manages a pair of first and second tone generating units. Each tone generating unit has four tone generation channels. Each tone generating unit has the logical and physical addresses. The TG unit number indicates the physical address. The table lists an operating state of each channel, indicative of attack, decay, sustain, release, vacant and damping and others.

Figure 27:
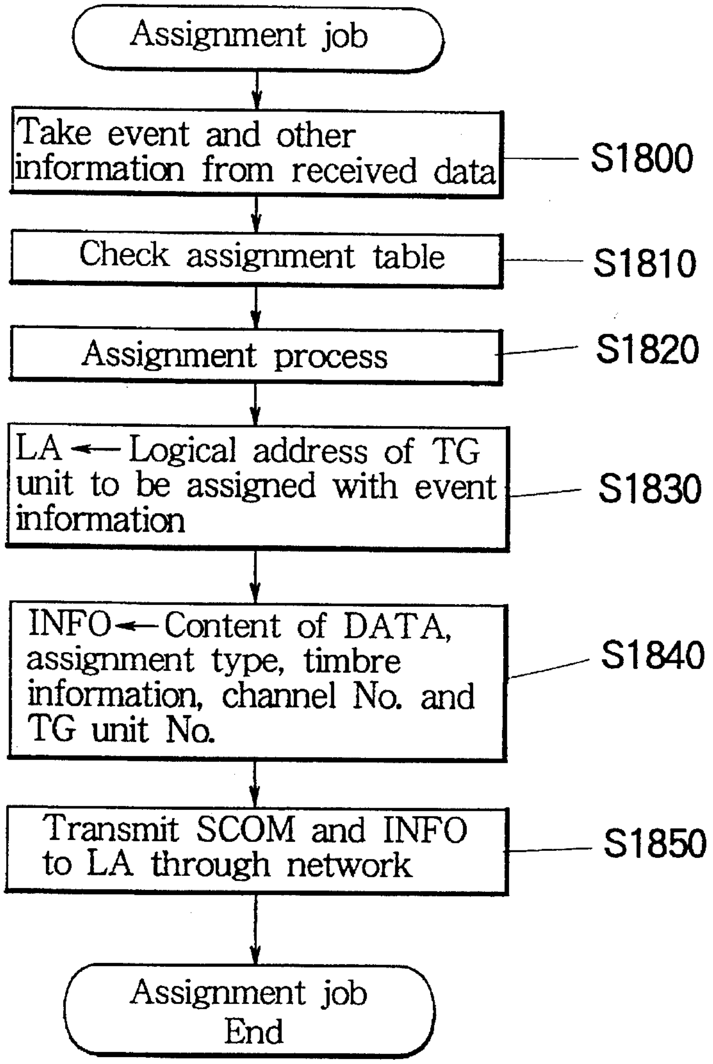
FIG. 27 is a flowchart showing an assignment job.

FIG. 27 shows a detail of the assignment job. Step S1800 is undertaken to take event information from the received data. Step S1810 is undertaken to check the assignment table formed by the assigner initialization process. Further, Step S1820 is undertaken to assign the event information to a particular channel of a particular TG unit listed in the FIG. 8 table. Step S1830 is undertaken to set the logical address of the tone generating unit to LA. Step S1840 is undertaken to set, as the additional information INFO, the pitch and touch information involved in the received data, the assignment type, timbre information, and selected channel number of the selected tone generating unit. Then, Step S1850 is undertaken to set the transmitting command SCOM with either of "Note On" or "Note Off". The set of SCOM and INFO is transmitted to the logical address LA in the network, thereby finishing the assignment job. It should be noted that the logical address is converted into the physical address at the actual data transmission by Step S1170 of FIG. 20.

Figure 28:
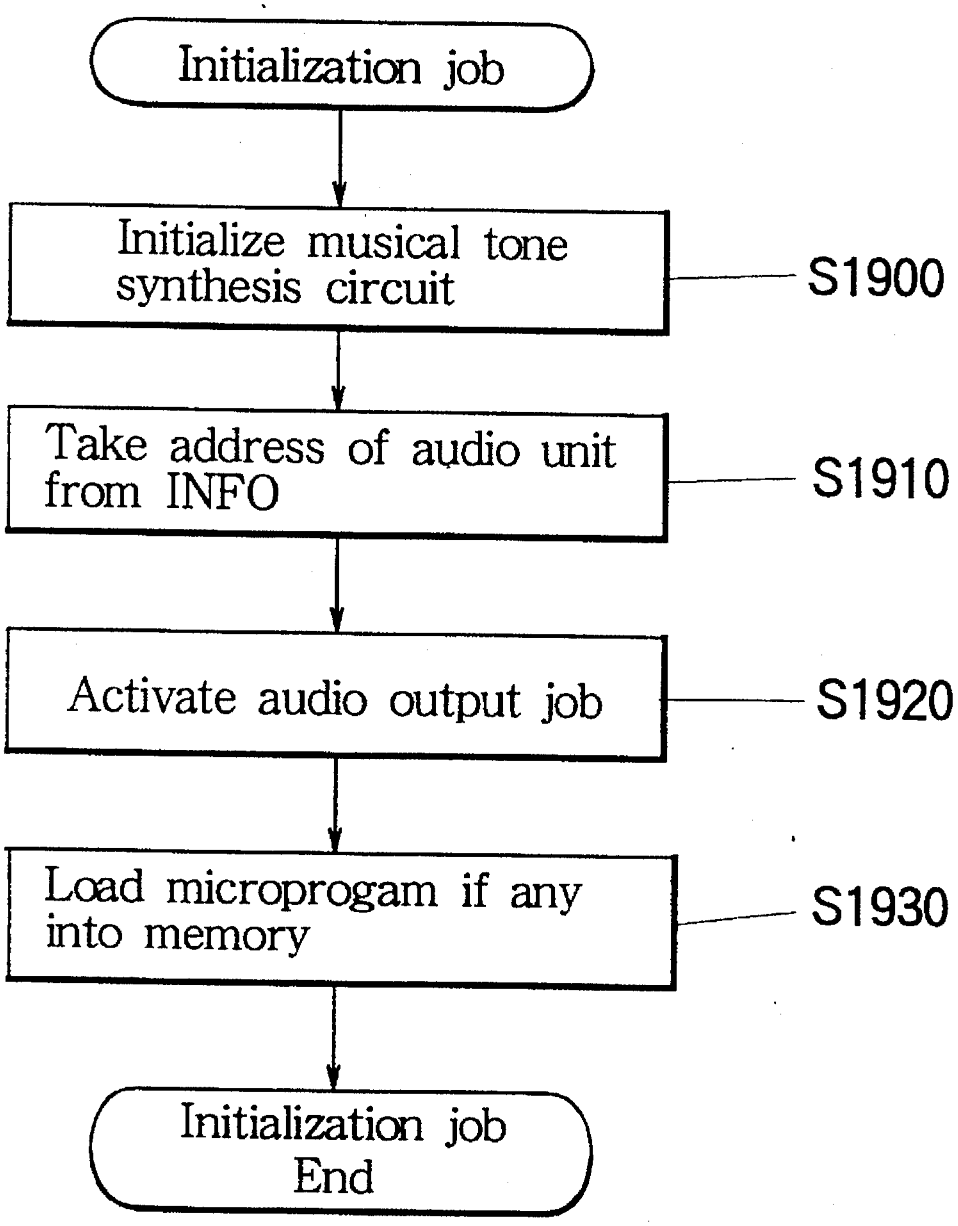
FIG. 28 is a flowchart showing an initialization job of a tone generating unit.

FIG. 28 shows a detail of the tone generating unit initialization job. Step S1900 is undertaken to initialize the musical tone synthesizing circuit. The circuit is once cleared to avoid generation of an inadvertent tone due to an old data. Then, Step S1910 is undertaken to retrieve the physical address of the audio unit from the additional information INFO which is supplied from the main unit. Further, Step S1920 is undertaken to activate an audio output job. Optionally, Step S1930 is undertaken if the tone generating unit is the simulation type using DSP such that the provided microprogram is stored in an internal memory. Thus, the initialization job of the tone generating unit is ended.

Figure 29:
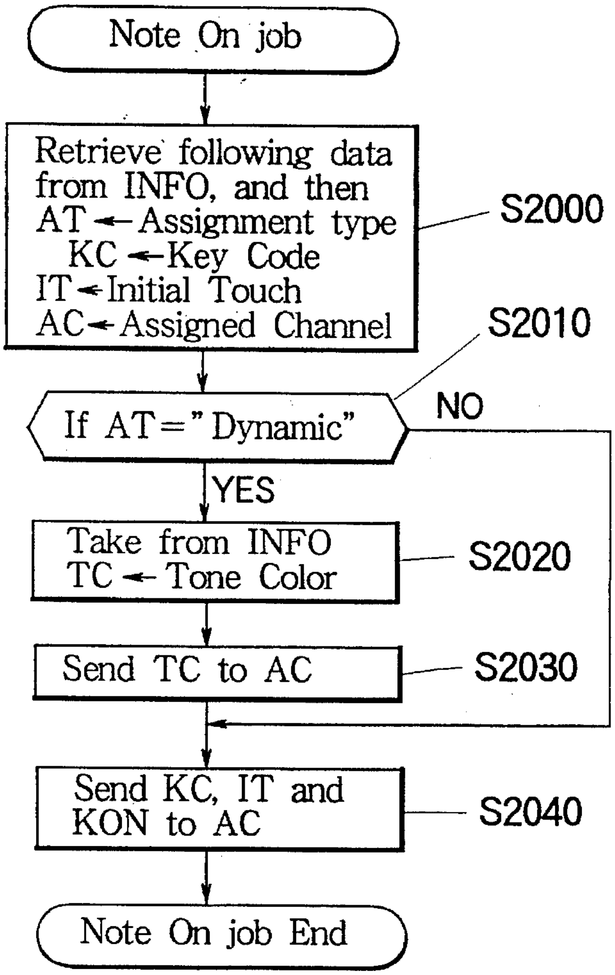
FIG. 29 is a flowchart showing a noteon job.

FIG. 29 shows a detail of the note on job. Step S2000 is undertaken to retrieve needed data from the additional information INFO which is supplied to the tone generating unit by the assignment job. Further, the retrieved data of Assignment Type, Key Code, Initial Touch and Assigned Channel are set to AT, KC, IT and AC, respectively. The assignment type is either static or dynamic. The static assignment type indicates the assignment to the simulation tone generating unit, using DSP. This tone generating unit is provisionally given the microprogram by Step S1930 of FIG. 28. The timbre of the generated tone is determined by the given microprogram. Therefore, the timbre is not changed unless the microprogram is changed. On the other hand, the dynamic assignment type indicates the assignment to, for example, the waveform memory tone generating unit, which can readily change the timbre by feeding a tone color code thereto. Consequently, in the dynamic assignment type, the timbre can be changed every keyon event or every tone generation assignment. In view of this, Step S2010 is undertaken to check as to if AT indicates "Dynamic". If YES, Step S2020 is undertaken to take a timbre data "Tone Color" from the additional information INFO. The data "Tone Color" is labeled by TC. Next, Step S2030 is undertaken to send this tone color code TC to the tone generating channel AC. Further, Step S2040 is undertaken to feed to the tone generating channel AC those of key code KC, initial touch information IT and keyon signal KON to thereby commence the tone generation, as in the case where the assignment type is static. Thus, the note on job is finished.

Figure 30:
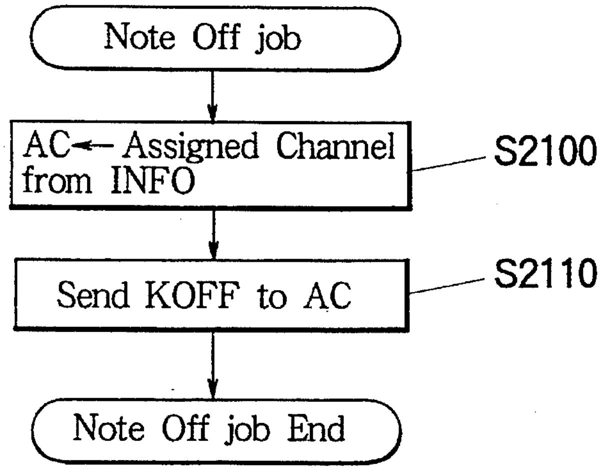
FIG. 30 is a flowchart showing a noteoff job.

FIG. 30 shows a detail of the note off job. Step S2100 is undertaken to take a data "Assigned Channel" from the additional information INFO. The taken data "Assigned Channel" is labeled by AC. Then, Step S2110 is undertaken to feed a keyoff signal KOFF to the tone generating channel AC, thereby stopping the tone generation. Thus, the note of job is ended.

Figure 31:
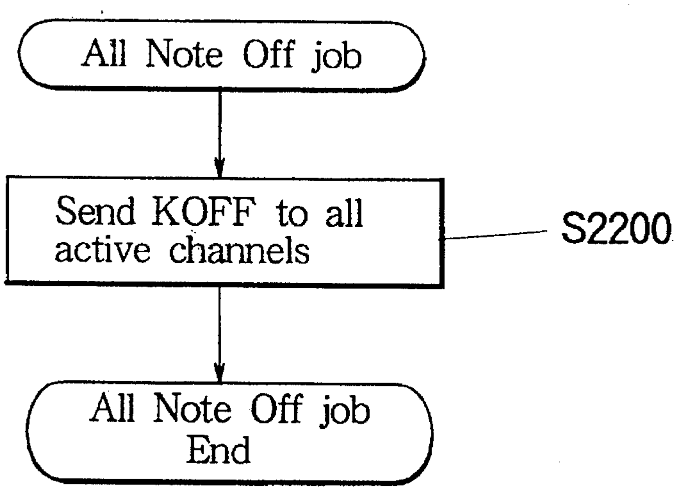
FIG. 31 is a flowchart showing an all noteoff job.

Occasionally, all note off job is carried out to stop all of the musical tones. In such a case, a keyoff signal KOFF is broadcasted to the network by using the logical address (3, 0). Consequently, as shown in FIG. 31, each tone generating unit undertakes Step S2200 to feed the received keyoff signal KOFF to all of the tone generating channels to concurrently stop all of the tone generations.

Figure 32:
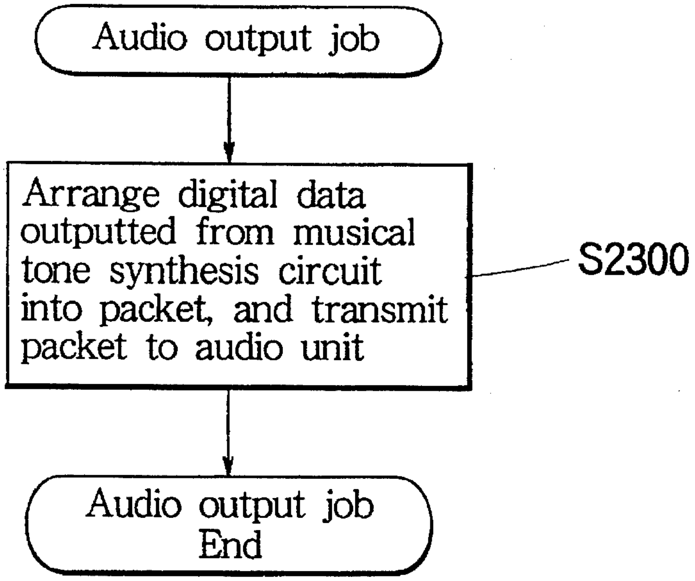
FIG. 32 is a flowchart showing an audio output job.
Figure 33:
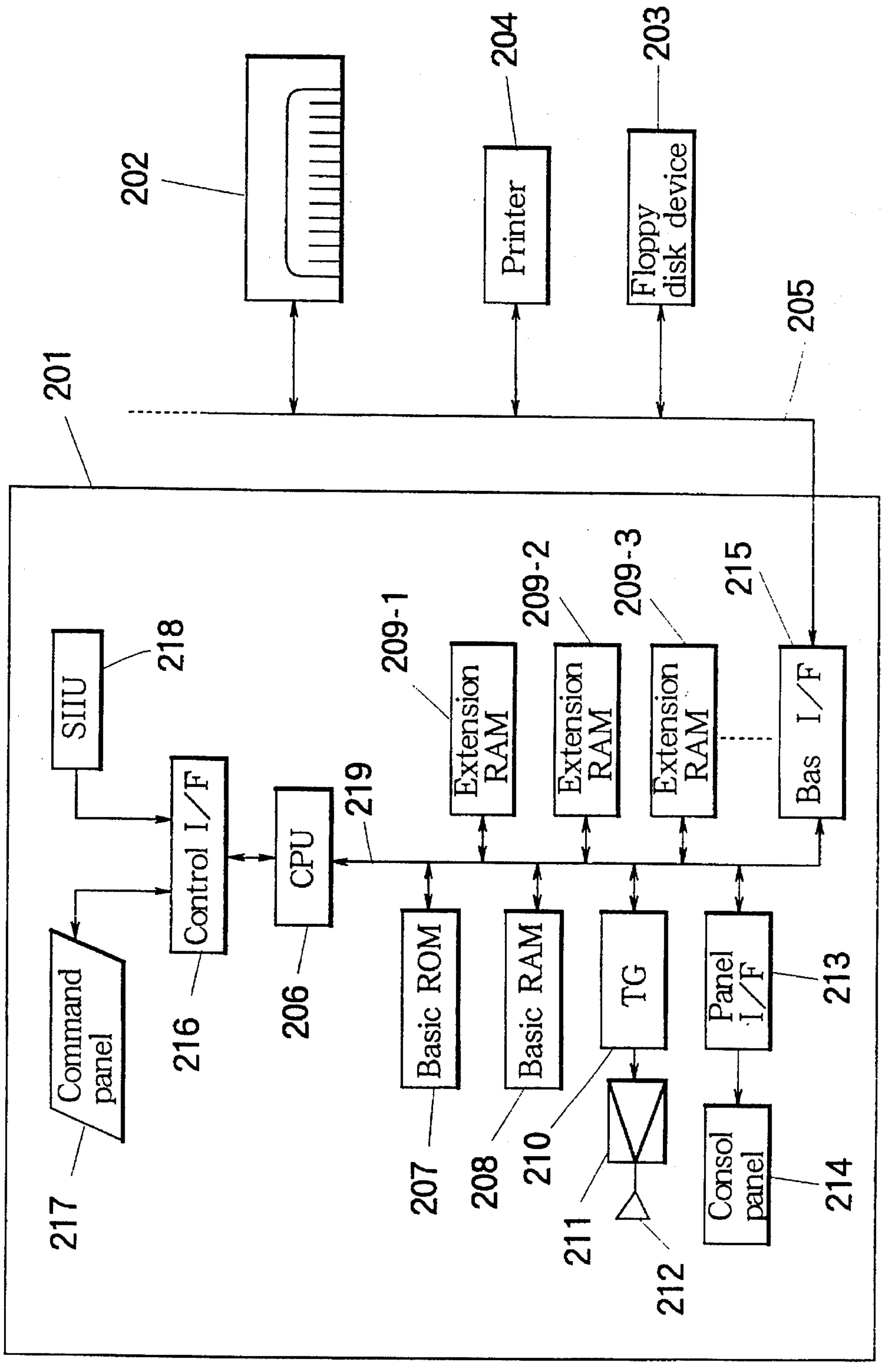
FIG. 33 PRIOR ART
FIG. 33 is a schematic block diagram showing a conventional network system of an electronic musical instrument.
Figure 34:
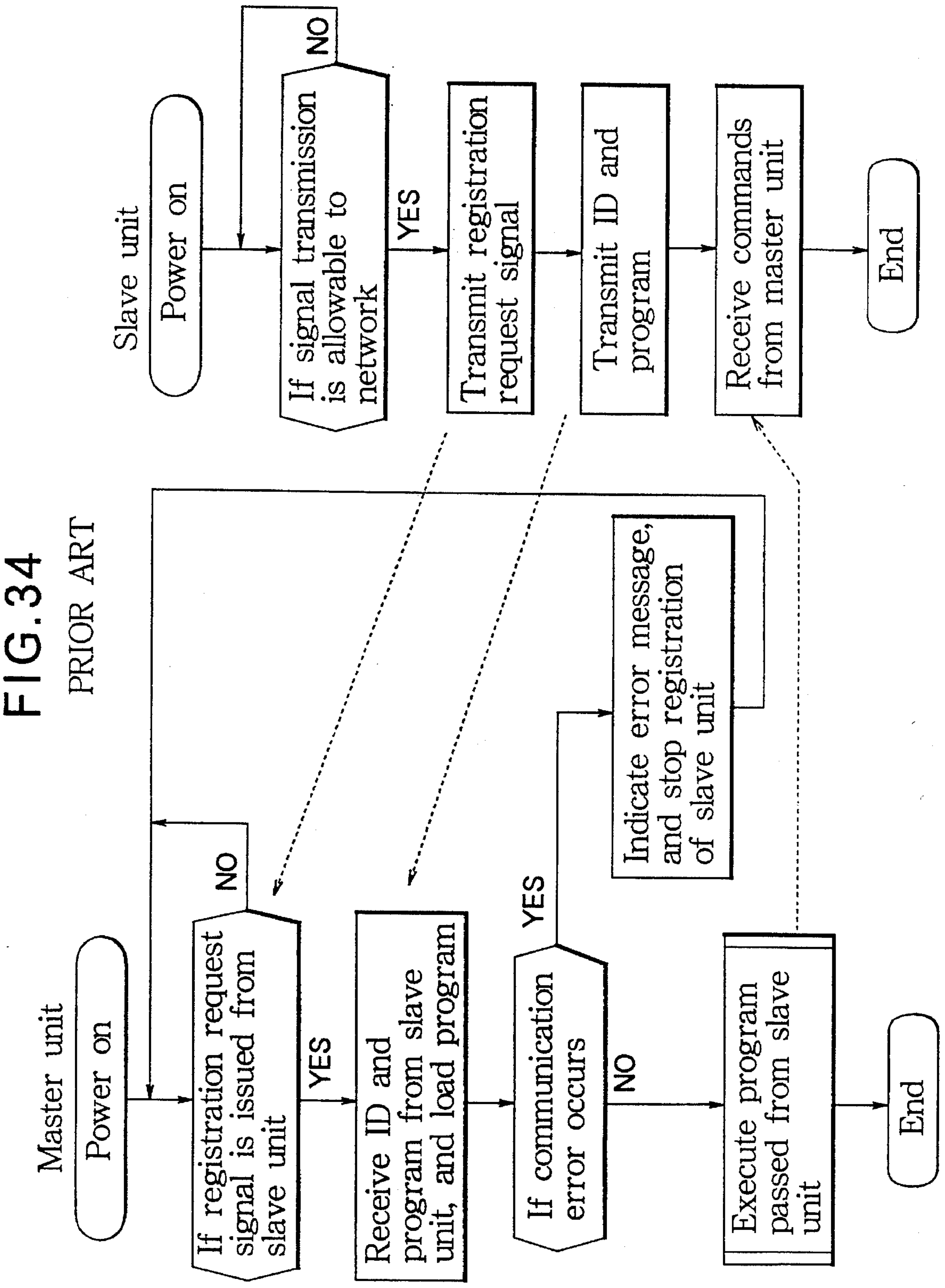
FIG.34 PRIOR ART
FIG. 34 is a flowchart showing operation of the conventional network system.

Lastly, FIG. 32 shows a detail of the audio output job activated by Step S1920 of FIG. 28. In this job, Step S2300 is undertaken to arrange a digital data outputted from the musical tone synthesizing circuit into a packet form, which is then transmitted to the audio unit.

In modification, two or more jobs can be allocated to one processing unit if the same has a surplus ability of information processing. For example, one processing unit may be installed with one program of key scanning job and another program of tone generation assignment job. The processing unit concurrently executes these programs in a time-sharing multi-task manner by interruption operation or else. In such a case, the processing unit is preferably allocated with adequate jobs which are associated with each other, rather than random allocation of diverse jobs. Namely, in the above noted case, event information obtained by the key scanning is readily processed according to the tone generation assignment program within the single processing unit without transferring the event information to a separate processing unit through the network. Such an arrangement can improve a response, and can reduce a data traffic of the network. Such a multi-task processing unit should be equipped with an additional control program effective to check as to if the unit itself has a concerned job prior to sending of information to the network. If YES, the information is not transmitted externally, but is processed internally by the unit.

In general, the greater the total number of the tone generating channels, the longer the processing time of the channel assignment job in proportion to the total channel number N according to a regular tone generation assignment algorithm. In such a case, the meta-assigner unit is introduced to shorten the processing time up to NlogN theoretically provided that the meta-assigner unit uniformly divides the assignment job ideally without a substantial overhead time. Actually, the meta-assigner unit has a certain overhead time so that the actual processing time may be longer than NlogN. In modification, two or more meta-assigner units are connected in multi-stages to speed up the assignment job. In such a case, the multi-stages of meta-assigner units and a meta-meta-assigner unit (which manages the meta-assigner units) are built in a single module to save a communication overhead as much as possible.

As described above, the inventive electronic musical instrument system includes a plurality of processing units which are linked together to set up a network. A master processing unit detects a characteristic profile of each slave processing unit in terms of its throughput or information processing performance and its external load such as various input and output devices. The master unit allocates adequate jobs to the respective slave units according to their characteristic profiles. The slave units cooperate with each other to execute the allocated jobs to thereby perform a desired musical operation as a whole. In a specific form, the inventive electronic musical instrument system includes a storage or memory unit which stores various application or control programs corresponding to diverse jobs. The master unit transfers adequate programs to each of the slave units to enable the same to perform the allocated jobs. In another specific form, the inventive electronic musical instrument system is installed with means for detecting channel numbers of plural tone generating units involved in the network, means for forming an assignment table according to the detected results for use in management of the assignment of musical tones to the channels of the respective tone generating units, and means operative based on the formed table to effect the musical tone assignment. In a further specific form, the inventive electronic musical instrument system is installed with means for selecting either of a single assigner unit and a plurality of assigner units which correspond to a plurality of groups of tone generating channels which are divided into the groups.

As described above, according to the invention, diverse jobs are automatically allocated to a plurality of processing units involved in a network, in contrast to the prior art in which the various jobs are carried out by a single electronic musical instrument. By such a construction, the inventive electronic musical instrument network system can achieve a diverse extension of musical operations, and can efficiently utilize the various resources involved in the network.

What is claimed is:

1. A musical system, comprising:

a plurality of processing units linked together forming a network;

check means linked to said network for checking a characteristic profile of each processing unit, said characteristic profile comprising at least a processing speed of said processing unit and an identification of any external device connected to said processing unit; and allocation means linked to said network for allocating a job to each of at least two of said plurality of processing units according to characteristic profiles of said at least two processing units so that said at least two processing units cooperatively perform a desired musical operation by each performing its allocated job, wherein a job allocated to at least one of said processing units comprises processing information distributed to said at least one processing unit via said network, and a job allocated to at least another of said processing units comprises controlling an external device connected to said Other of said processing units.

2. A musical system according to claim 1, further comprising storage means linked to said network for storing various programs, and providing means for selectively retrieving a particular program from the storage means and providing the same to a selected processing unit according to the job allocated thereto so that the selected processing unit operates according to the provided program to carry out the allocated job.

3. A musical system according to claim 1 wherein said plurality of processing units include at least the following processing units:

a first processing unit to which an input job is allocated, said first processing unit successively receiving event information from an external device;

at least one second processing unit to which a tone generation job is allocated, said at least one second processing unit having a plurality of channels which are divided into a plurality of groups and which selectively process event information to generate a corresponding musical tone;

a plurality of third processing units to which an assignment job is allocated, each of said third processing units corresponding to one of said plurality of groups and assigning event information to one channel of the corresponding group; and a fourth processing unit to which a meta-assignment job is allocated, said fourth processing unit receiving event information from the first processing unit and distributing the event information received from the first processing unit to one of the plurality of third processing units.

4. A musical system comprising:

a plurality of processing units linked together forming a network;

check means linked to said network for checking a characteristic profile of each processing unit, said characteristic profile comprising at least a processing speed of said processing unit and an identification of any external device connected to said processing unit;

allocation means linked to said network for allocating a job to each of at least two processing units according to characteristic profiles of each of said at least two processing units; and providing means linked to said network for storing various programs and for selectively providing the stored programs to the respective processing units according to the jobs allocated thereto so that the processing units execute the provided programs to cooperatively perform a desired musical operation by each performing its allocated job, wherein a job allocated to at least one of said processing units comprises processing information distributed to said at least one processing unit via said network, and a job allocated to at least another of said processing units comprises controlling an external device connected to said other of said processing units.

5. An electronic musical instrument comprising:

a plurality of tone generating channels divided into multiple groups;

a plurality of assigner means each corresponding to one of said groups and assigning musical event information to one tone generating channel belonging to its corresponding group; and meta-assigner means for receiving a sequence of musical event information and distributing each said musical event information in said sequence to one of said assigner means.

6. An electronic musical instrument according to claim 5 further comprising:

sequence producing means for producing at least a portion of said sequence of musical event information in accordance with recorded performance data.

7. An electronic musical instrument according to claim 5 further comprising:

input means for receiving at least a portion of said sequence of musical event information from an external source.

* * * * *